US008046871B2

(12) United States Patent  
Yamauchi

(10) Patent No.: US 8,046,871 B2  
(45) Date of Patent: Nov. 1, 2011

(54) CASTER

(75) Inventor: Toshio Yamauchi, Fujisawa (JP)

(73) Assignee: Kabushiki Kaisha Box, Tokyo (JP)

( * ) Notice: Subject to any disclaimer, the term of this patent is extended or adjusted under 35 U.S.C. 154(b) by 0 days.

(21) Appl. No.: 12/715,370

(22) Filed: Mar. 1, 2010

(65) Prior Publication Data

US 2010/0162520 A1 Jul. 1, 2010

Related U.S. Application Data

(62) Division of application No. 10/576,610, filed as application No. PCT/JP2004/010932 on Jul. 30, 2004, now abandoned.

(51) Int. Cl.
| | |
|---|---|
| A47B 91/00 | (2006.01) |
| B60B 33/00 | (2006.01) |
| B60B 15/00 | (2006.01) |
| B62D 55/08 | (2006.01) |

(52) U.S. Cl. ............... 16/45; 305/160; 305/47; 305/195
(58) Field of Classification Search .................... 16/387; 280/5.22; 305/202, 204, 47, 48, 49, 19, 157, 305/159, 160, 200, 201, 163, 164, 185, 161
See application file for complete search history.

(56) References Cited

U.S. PATENT DOCUMENTS

| | | | | |
|---|---|---|---|---|
| 169,955 | A | * | 11/1875 | Bushnell ........................ 474/220 |
| 252,348 | A | * | 1/1882 | Benson ............................ 305/19 |
| 484,827 | A | * | 10/1892 | Stewart ........................ 305/202 |
| 737,779 | A | * | 9/1903 | Schenk ......................... 305/126 |
| 954,993 | A | * | 4/1910 | Peters ......................... 280/11.19 |
| 1,066,754 | A | * | 7/1913 | Rison .............................. 16/18 B |
| 1,107,492 | A | * | 8/1914 | Carr ................................ 305/19 |
| 1,109,400 | A | * | 9/1914 | Carr ................................ 305/19 |
| 1,127,362 | A | * | 2/1915 | Johnston ......................... 305/19 |
| 1,345,622 | A |   | 7/1920 | Nack |
| 1,397,171 | A |   | 11/1921 | Millet |
| 1,414,735 | A | * | 5/1922 | Greenslade ................. 152/185.1 |
| 1,496,298 | A | * | 6/1924 | Chapman ..................... 474/218 |
| 1,580,653 | A | * | 4/1926 | Dawson et al. .............. 305/198 |
| 1,810,854 | A | * | 6/1931 | Rimailho .......................... 152/6 |
| 1,934,820 | A | * | 11/1933 | Rorabeck ..................... 305/113 |
| 1,950,748 | A | * | 3/1934 | Rimple ........................... 305/47 |
| 2,655,686 | A | * | 10/1953 | Summersgill .................. 16/387 |

(Continued)

FOREIGN PATENT DOCUMENTS

JP 61176076 A 8/1986

(Continued)

*Primary Examiner* — Victor Batson  
*Assistant Examiner* — Emily Morgan  
(74) *Attorney, Agent, or Firm* — Birch, Stewart, Kolasch & Birch, LLP

(57) ABSTRACT

A caster of an endless structure is provided which is almost jam-proof even in the case of a bigger gap. The caster includes a first wheel supported on a mounting leg, a second wheel supported by an axle on one end of a suspension arm of which the other end is supported by an axle which also supports the first wheel, and a wrap-around member which is wrapped around the first and second wheels. The wraparound member is formed an endless belt form by connecting independent pieces to each other. The outer peripheral section of each piece is provided with a wider section and when the wrap-around member is depressed and warps, the wider section is adapted to touch a wider section of the adjacent piece, thereby preventing further depression.

7 Claims, 36 Drawing Sheets

U.S. PATENT DOCUMENTS

| | | | |
|---|---|---|---|
| 2,829,013 A * | 4/1958 | Patrick | 305/45 |
| 2,844,413 A | 7/1958 | Gates | |
| 2,917,120 A | 12/1959 | Gates et al. | |
| 2,973,995 A * | 3/1961 | Weier | 305/113 |
| 3,063,087 A * | 11/1962 | Thomas | 16/387 |
| 3,104,113 A * | 9/1963 | Montz | 280/5.22 |
| 3,188,150 A * | 6/1965 | Sandganger | 305/159 |
| 3,276,531 A | 10/1966 | Hale | |
| 4,056,289 A * | 11/1977 | Gilliland | 305/47 |
| 4,123,120 A * | 10/1978 | Kohriyama | 305/41 |
| 4,175,797 A | 11/1979 | Krekeler | |
| 4,752,105 A * | 6/1988 | Barnard | 305/160 |
| 4,813,750 A | 3/1989 | Erlenmaier et al. | |
| 4,995,678 A | 2/1991 | Jinkens | |
| 6,158,536 A | 12/2000 | Misawa | |
| 2009/0218882 A1 * | 9/2009 | Rowbottom et al. | 305/158 |

FOREIGN PATENT DOCUMENTS

| | | |
|---|---|---|
| JP | 62156089 A | 7/1987 |
| JP | 11-20401 A | 5/1989 |
| JP | 11-91304 A | 8/1989 |
| JP | 5060902 A | 3/1993 |
| JP | 8-225001 A | 9/1996 |
| JP | 9058204 A | 3/1997 |
| JP | 9240527 A | 9/1997 |
| JP | 10-129541 A | 5/1998 |
| JP | 10211802 A | 8/1998 |
| JP | 2001260955 A | 9/2001 |
| JP | 2001-88507 A | 10/2002 |
| JP | 2002337766 A | 11/2002 |
| JP | 2003-94906 A | 10/2004 |
| JP | 2004284570 A | 10/2004 |

\* cited by examiner

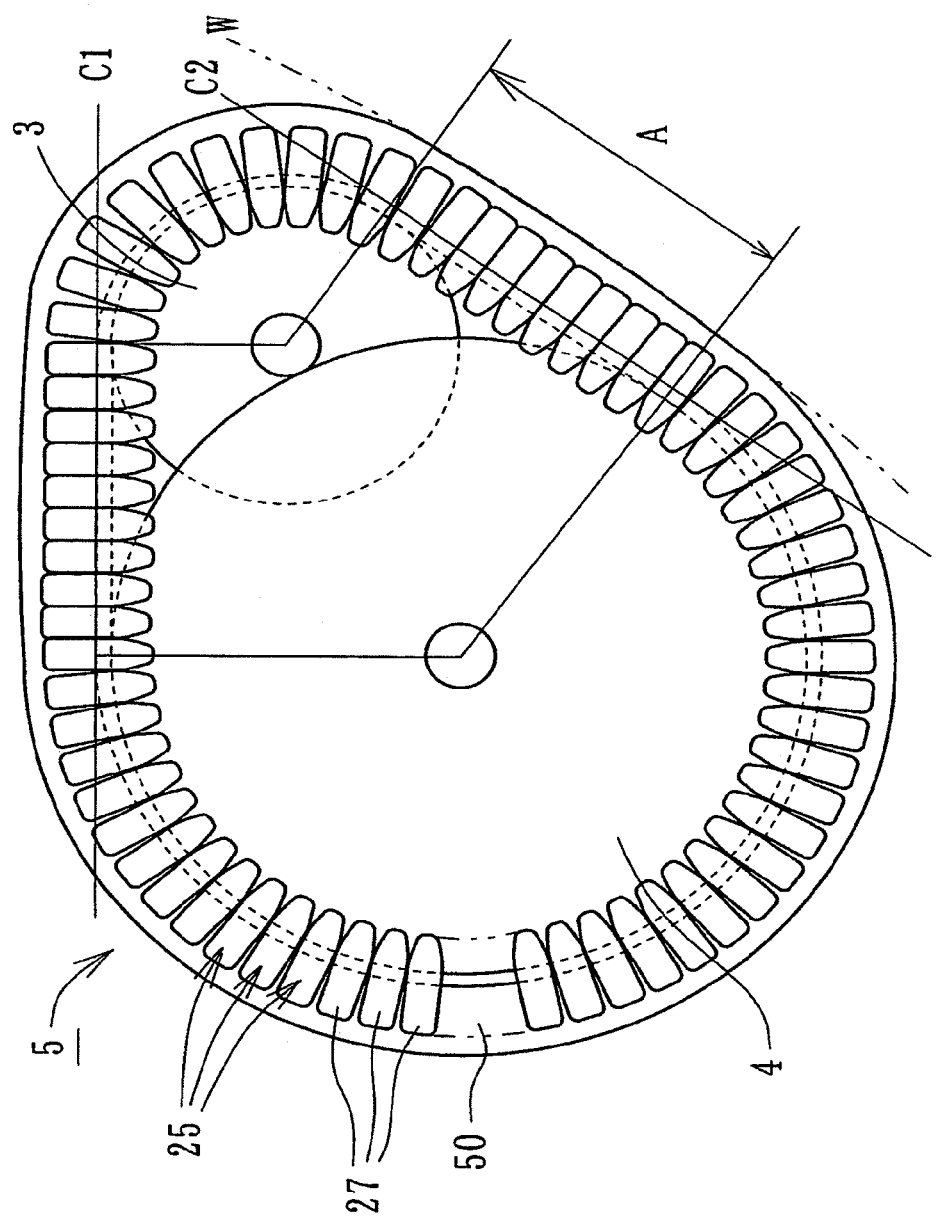

CASTER

CROSS-REFERENCE TO RELATED APPLICATION

The present application is a Divisional Application of U.S. application Ser. No. 10/576,610 filed on Apr. 21, 2006 now abandoned, and claims priority under 35 U.S.C. §119 to PCT Patent Application No. PCT/JP 2004/010932 filed on Jul. 30, 2004, the entire contents of which are hereby incorporated by reference.

BACKGROUND OF THE INVENTION

1. Field of the Invention

The present invention relates to a caster for use in a wheelchair, furniture, vehicle, and the like which is almost jam-proof and capable of easily climbing over a gap or obstacle.

2. Description of the Prior Art

A caster for a wheelchair etc. comprising a pair of front and rear wheels and an endless belt wrapped around the wheels and designed to be capable of easily passing over a gap is known (for example, refer to Patent Document 1). A caster designed to climb stairs by tracked wheels is also known (for example, refer to Patent Document 2).

Patent Document 1: Japanese Unexamined Patent Publication No. Hei 8-225001

Patent Document 2: Japanese Unexamined Patent Publication No. 2002-3747 (see FIG. 8)

When a caster with an endless belt climbs over a gap, the endless belt is pushed against the gap and depressed inward (i.e., toward the center of a space surrounded by the endless belt or a wrap-around member in the surface of rotation of the endless belt or the wrap-around member; hereinafter referred to as "inward"). The more the endless belt is depressed, the greater the power needed to pass the gap. Accordingly, in the Patent Document 1, many presser rollers are arranged inside the endless belt to prevent the belt from being depressed. However, arrangements of many rollers make a structure for holding these rollers complicated and the entire device large, increasing the weight, and thereby driving up costs.

SUMMARY OF THE INVENTION

It is therefore an object of the present invention to solve these problems.

According to an embodiment of the present invention, a caster is provided with first and second wheels disposed forward and back and a wrap-around member wrapped around the first and second wheels, and is characterized in that the wrap-around member consists of a plurality of pieces continuous in the circumferential direction. Each piece is provided with an outer peripheral section and an inner peripheral section which are moveable independent of the adjacent pieces, permit the wrap-around member to bend (hereinafter referred to as "inner bending" or "outer bending") along the first and second wheels, and the outer peripheral section is adapted to contact outer peripheral sections of the adjacent pieces when the wrap-around member is pushed inside the surface of rotation by an external force, thereby preventing the wrap-around member from being depressed inside the surface of rotation.

According to an embodiment of the present invention, the outer peripheral section of the caster is provided in such a manner that the outer peripheral sections of the adjacent pieces contact each other when they are close on a common tangent of the first and second wheels.

According to an embodiment of the present invention, each piece of the caster is independently formed and connected to the others by a connecting member in a circular form.

According to an embodiment of the present invention, each piece is provided with a tire section on the outer peripheral side and a wheel guide section into which the outer peripheral sections of the first and second wheels are fitted.

According to an embodiment of the present invention, the tire section and the wheel guide section are respectively formed as separate bodies.

According to an embodiment of the present invention, the first and second wheels overlap each other when viewed from the direction perpendicular to the surface of rotation.

According to an embodiment of the present invention, the first and second wheels have different diameters and a plurality of wheels with a larger diameter is provided in the direction of the axis of rotation.

According to an embodiment of the present invention, the wrap-around member is provided with a tire section on the outer peripheral side and a wheel guide section on the inner peripheral side, the tire section is formed of a continuous endless belt, and the wheel guide section is provided to engage each outer peripheral section of the first and second wheels and is combined with the tire section to form the piece.

According to an embodiment of the present invention, the wrap-around member is provided with a tire section on the outer peripheral side and a wheel guide section on the inner peripheral side, the wheel guide section being provided to engage each outer peripheral section of the first and second wheel sections and formed of a continuous endless belt, and the piece is formed by the tire section and the wheel guide section.

According to an embodiment of the present invention, the wrap-around member is formed of a single endless belt in its entirety and slits cut in from the outer peripheral side at the same interval in the longitudinal direction and grooves, wider than each slit, formed from the inner peripheral side at the same interval in the longitudinal direction form the piece.

According to an embodiment of the present invention, the first wheel is provided in such a manner that the diameter is ⅕ or less of that of the second wheel and its thickness is substantially the same as that of the second wheel, wherein the first wheel is disposed close to the outer periphery of the second wheel so that the first and second wheels are disposed on the same straight line when viewed from the direction of each thickness.

According to an embodiment of the present invention, a plurality of first wheels is provided along the outer periphery of the second wheel.

According to an embodiment of the present invention, each piece is provided with a protrusion on one side of the piece in the front and rear direction and a depression on the other side thereof, wherein the protrusion of one piece is inserted into the depression of the other piece which is adjacent forward and back, thereby connecting a wall section surrounding the depression to the protrusion by a single shaft.

According to an embodiment of the present invention, a joint piece provided with pipe sections on either end of each piece in the front and rear direction is provided and each pipe section is fitted into each depression formed on the pieces which are adjacent forward and back, thereby connecting each piece to the pipe sections by a single connecting shaft.

Effects of the invention include the following:

According to an embodiment of the present invention, a wrap-around member is formed by a plurality of pieces that are connected to each other and continue in the circumferential direction. Each piece is provided with an outer peripheral section and an inner peripheral section that are moveable independent of the adjacent pieces to permit the wrap-around member to bend inward. When the wrap-around member runs over a gap, the wrap-around member is pushed against the gap from outside, depressed inward and the front and rear sections are bent outward. However, the adjacent outer peripheral sections mutually contact each other in the circumferential direction to prevent the depression from being generated. In this manner, the wrap-around member is not depressed, but is substantially straight while running over the gap. Thus, this straight section functions as an anti-sticking plate to permit the wrap-around member to climb over the gap, thereby improving the gap climbing performance.

This depression preventing function can be realized by the structure of the wrap-around member itself and no separate presser rollers and plates are needed inside the wrap-around member. In this manner, these presser members can be made useless and there is no necessity to support these members. As a result, it is possible to provide a simple structure, make the entire device compact and lightweight, and reduce costs.

According to an embodiment of the present invention, in a section of the wrap-around member close on a common tangent of the first and second wheels, the outer peripheral sections of the adjacent pieces mutually contact to exhibit a depression preventing function. In this manner, it is possible to maintain a straight condition, as-is, in the section of the wrap-around member close on the common tangent which is normally straight.

According to an embodiment of the present invention, since each piece is formed independently, it is possible to easily form the wrap-around member by coupling these independent pieces together by a suitable connecting member in a ring shape. It is also possible to exchange part of the wrap-around member or adjust the length thereof.

According to an embodiment of the present invention, since the piece is provided with a tire section and a wheel guide section, the tire section can provide satisfactory ground contact performance, while the wheel guide section can prevent disengagement of a large diameter wheel from a small diameter wheel to provide good transmission of rotation.

According to an embodiment of the present invention, since the tire section and the wheel guide section are respectively formed as separate bodies, combination of the tire section with the wheel guide section can be selected such as exchange of the tire section in accordance with the intended use and as a result, it is possible to freely change the performance.

According to an embodiment of the present invention, since the first and second wheels are provided to overlap each other in a side view, it is possible to make the entire device compact.

According to an embodiment of the present invention, since the first and second wheels are provided to have different diameters and a plurality of wheels with a larger diameter is provided in the direction of the axis of rotation, it is possible to consolidate the wheel on the larger diameter side that is a load-carrying main body.

According to an embodiment of the present invention, the wrap-around member is provided with a tire section on the outer peripheral side and a wheel guide section on the inner peripheral side, the tire section being formed of a continuous endless belt, and the wheel guide section being connected to the tire section to form the piece. In this manner, it is possible to assemble the wrap-around member only by mounting each wheel guide section on the common tire section formed in the endless belt shape and thus make the production easy.

According to an embodiment of the present invention, the wrap-around member is provided with a tire section on the outer peripheral side and a wheel guide section on the inner peripheral side, the wheel guide section is formed of a continuous endless belt, and the piece is formed by the tire section and the wheel guide section. In this manner, it is possible to assemble the wrap-around member only by mounting each tire section on the common wheel guide section formed of the continuous endless belt and thus make the production easy.

According to an embodiment of the present invention, the wrap-around member is formed by a single member in its entirety, the peripheral section being formed by a slit cut in from the outer peripheral side, and the inner peripheral section being formed by a groove, wider than the slit on the outer peripheral side, formed from the inner peripheral side. In this manner, it is possible to reduce the number of parts, realize the simplest structure, and thus make the production easy.

According to an embodiment of the present invention, a first wheel of a minimum size is provided. Even though the first wheel is provided on the same line on the outer peripheral section of a second wheel, it is possible to arrange the first and second wheels without increasing the center distance. In this manner, the first wheel can be provided in the same width as the second wheel even in the axial direction. It is therefore possible not only to make the caster compact in its entirety, but also to increase an approach angle and improve the gap climbing performance.

According to an embodiment of the present invention, the first wheel of the minimum size is provided. A plurality of first wheels can be disposed along the outer periphery of the second wheel. In this manner, it is possible to make the caster compact and reduce each allotted load.

According to an embodiment of the present invention, since the piece is provided with a protrusion and a depression, it is possible to couple the adjacent pieces together by a single connecting shaft.

According to an embodiment of the present invention, since a joint piece provided with pipes is provided, it is possible to couple the adjacent pieces and joint piece together by a single connecting shaft. It is also possible make the structure of the piece simple.

BRIEF DESCRIPTION OF THE DRAWINGS

FIG. 20 is a cross-sectional view taken along line 20-20 of FIG. 19;

FIG. 21 is a cross-sectional view taken along line 21-21 of FIG. 19;

FIG. 22 is a view similar to FIG. 19 according to a seventh embodiment;

FIG. 23 is a view similar to FIG. 21 according to the seventh embodiment;

FIG. 24 is a view similar to FIG. 4 according to an eighth embodiment;

FIG. 27 is a view similar to FIG. 26 showing another example according to the eighth embodiment;

FIG. 28 is a view showing a bottom surface side of a tire section of said another example according to the eighth embodiment;

FIG. 56 is a view showing the connecting condition of pieces according to a sixteenth embodiment;

DETAILED DESCRIPTION OF THE PREFERRED EMBODIMENTS

Figure 1:
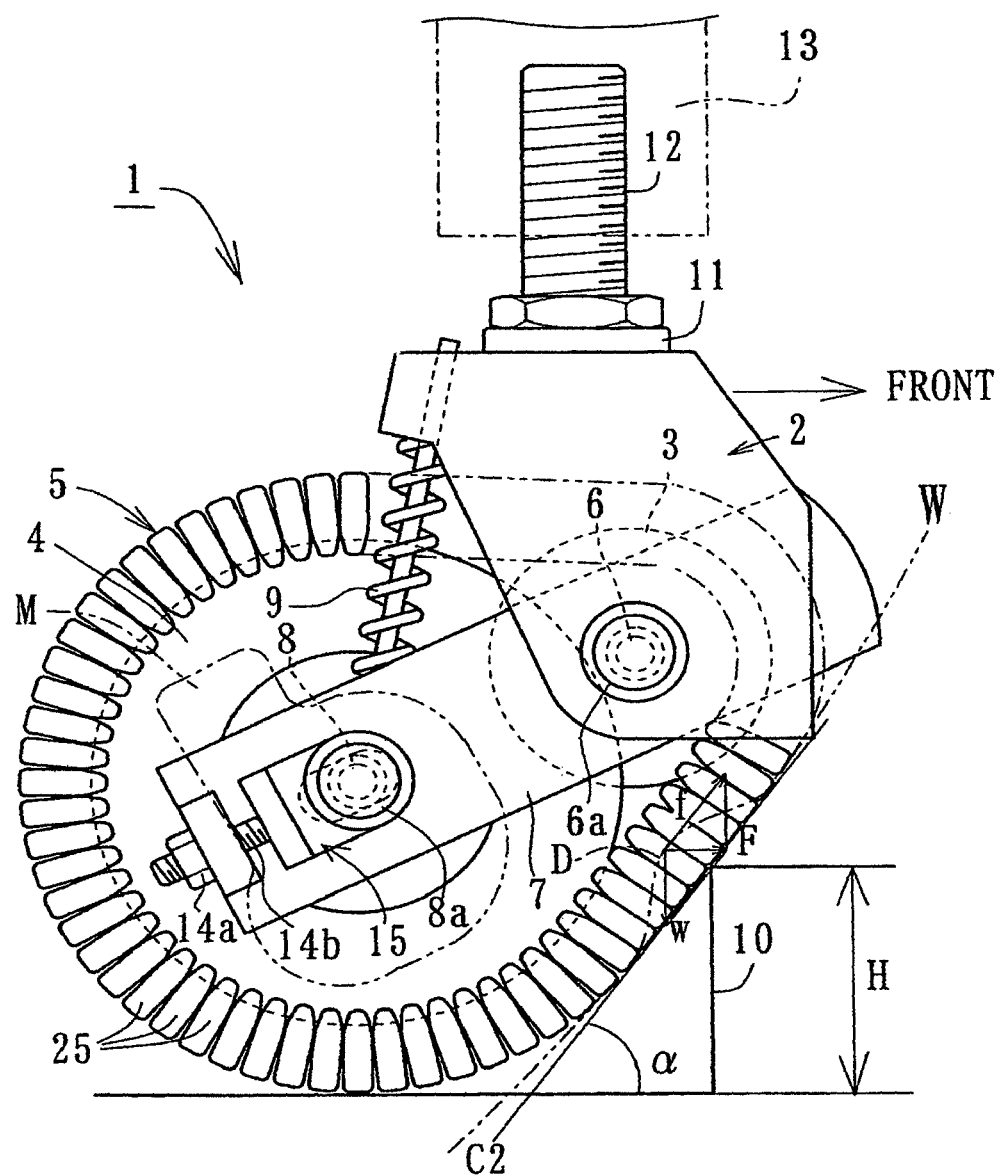
FIG. 1 is a side view of a caster according to a first embodiment of the present invention.
Figure 2:
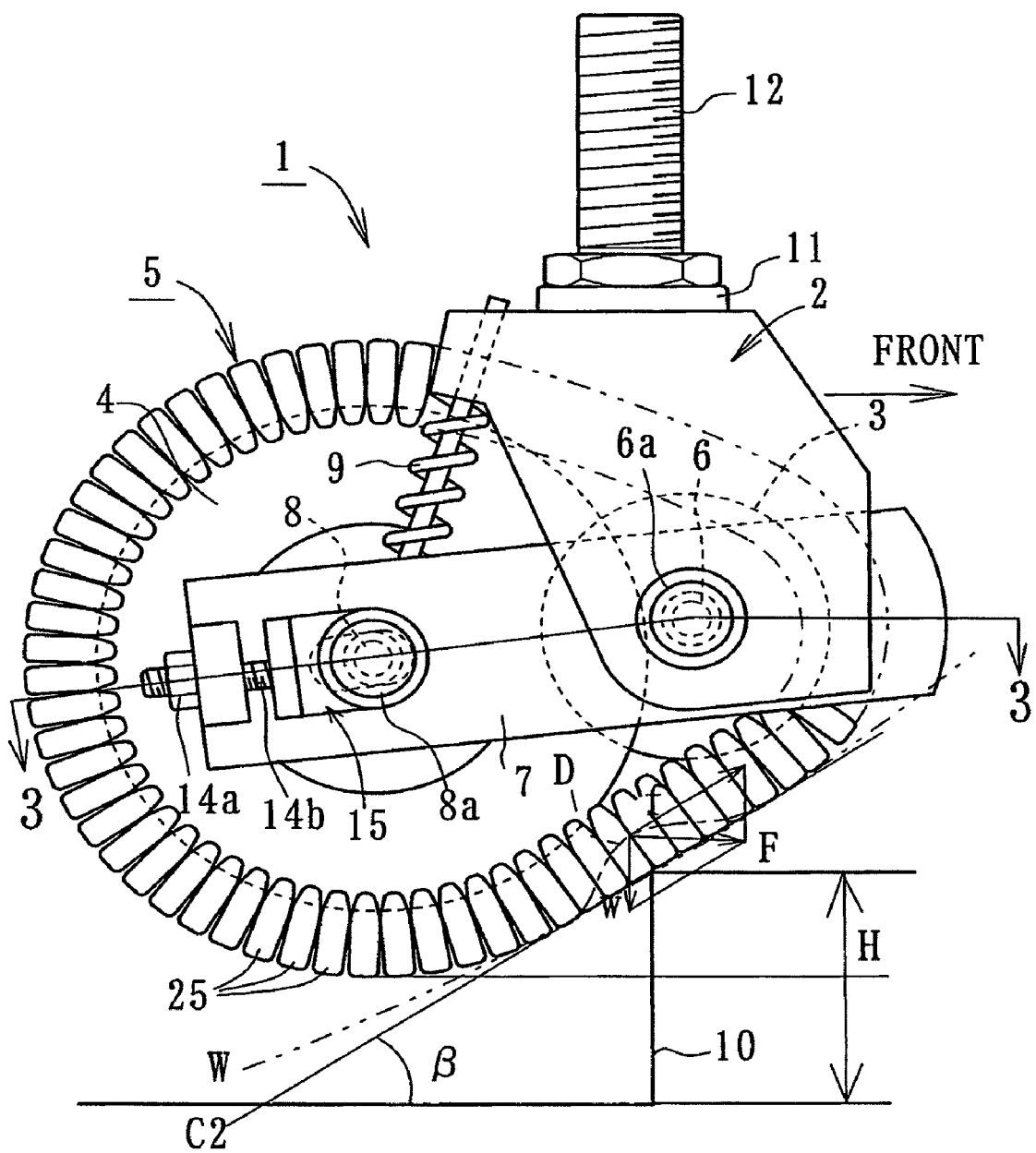
FIG. 2 is a view showing the situation when the caster according to the first embodiment climbs over a gap.
Figure 3:
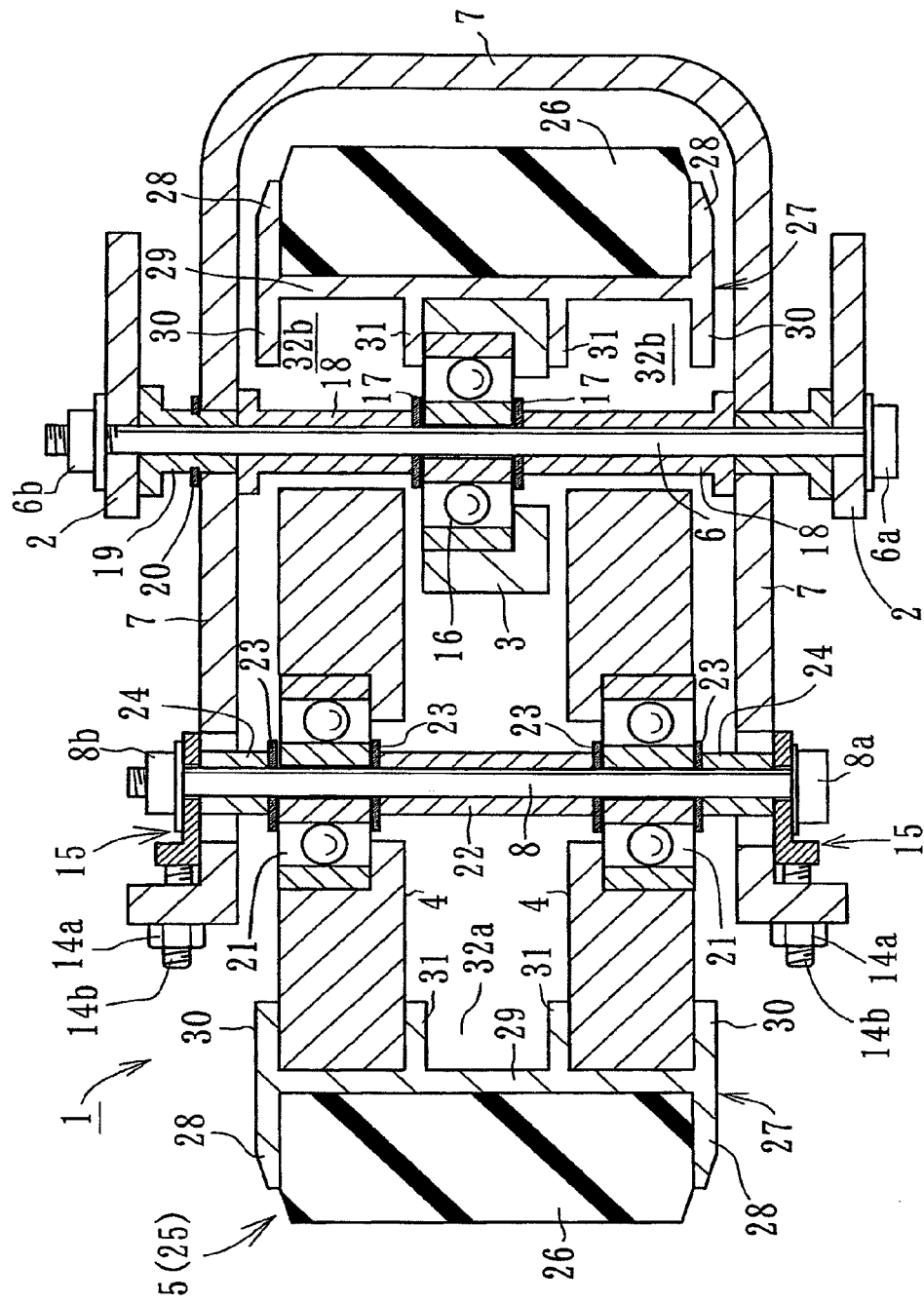
FIG. 3 is a cross-sectional view taken along line 3-3 of FIG. 2.
Figure 4:
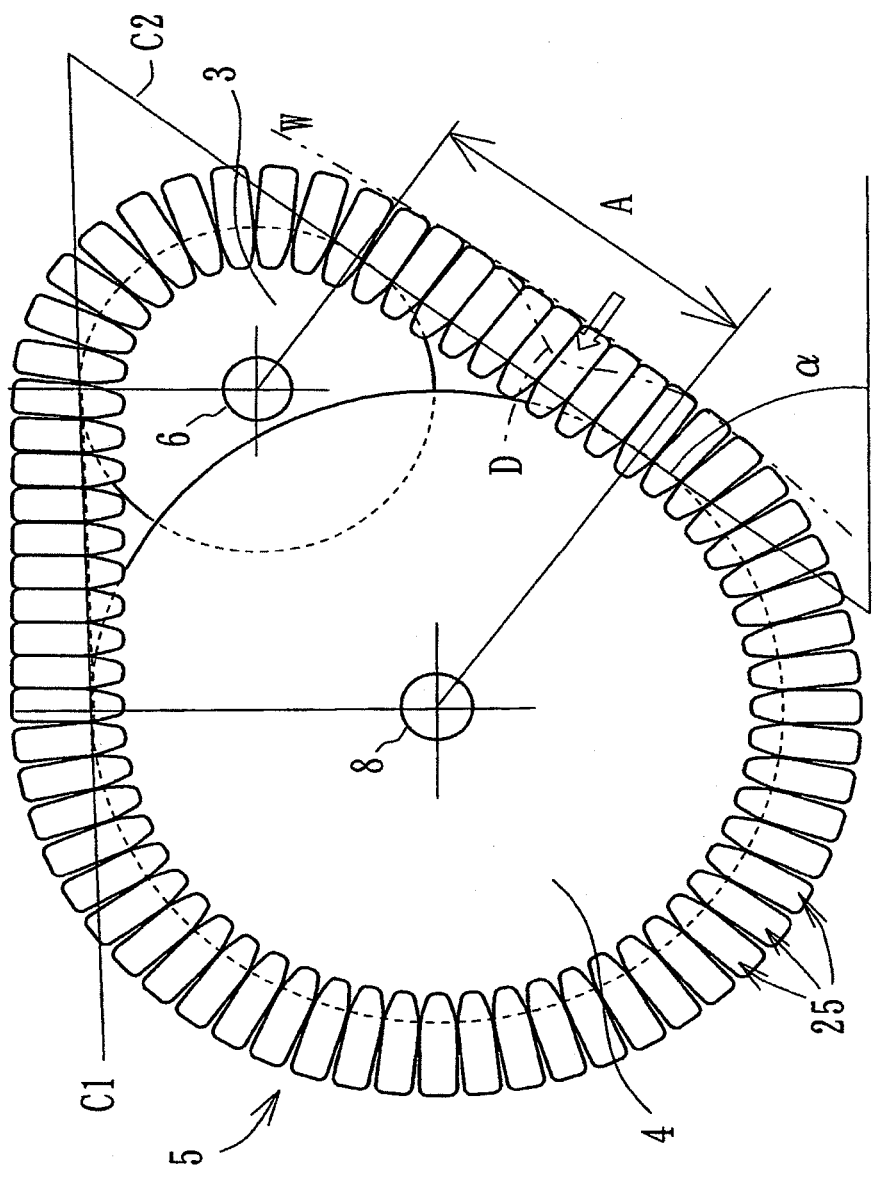
FIG. 4 is a schematic view showing a wrap-around member according to the first embodiment.
Figure 5:
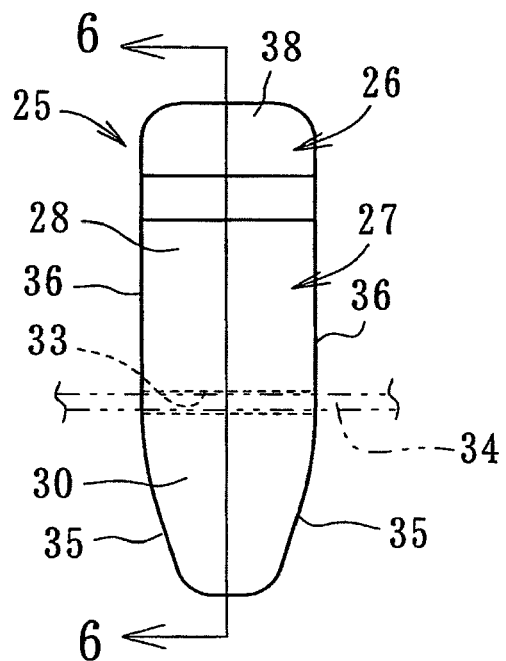
FIG. 5 is an enlarged view of part of the wrap-around member.
Figure 6:
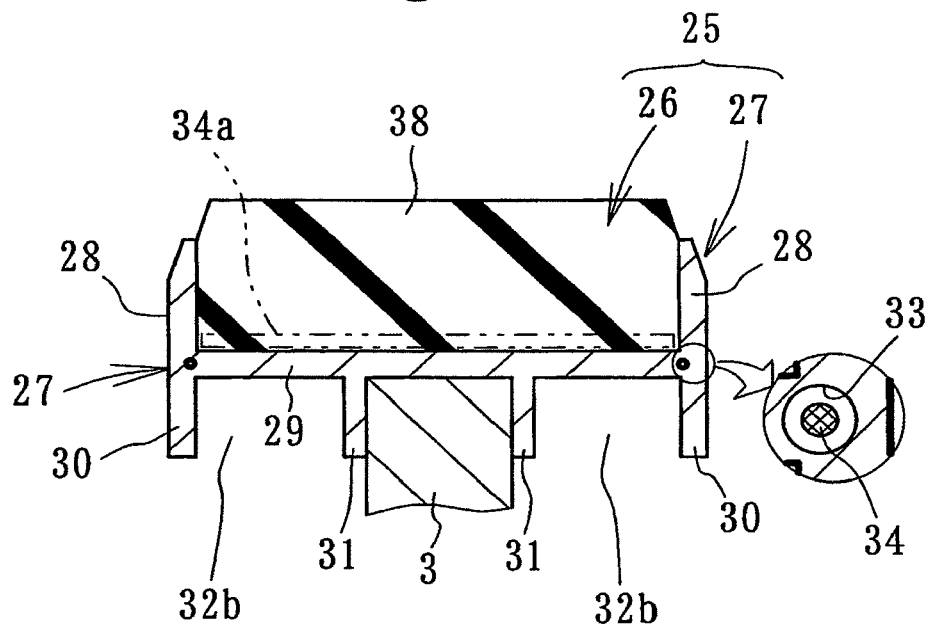
FIG. 6 is a cross-sectional view taken along line 6-6 of FIG. 5.
Figure 7:
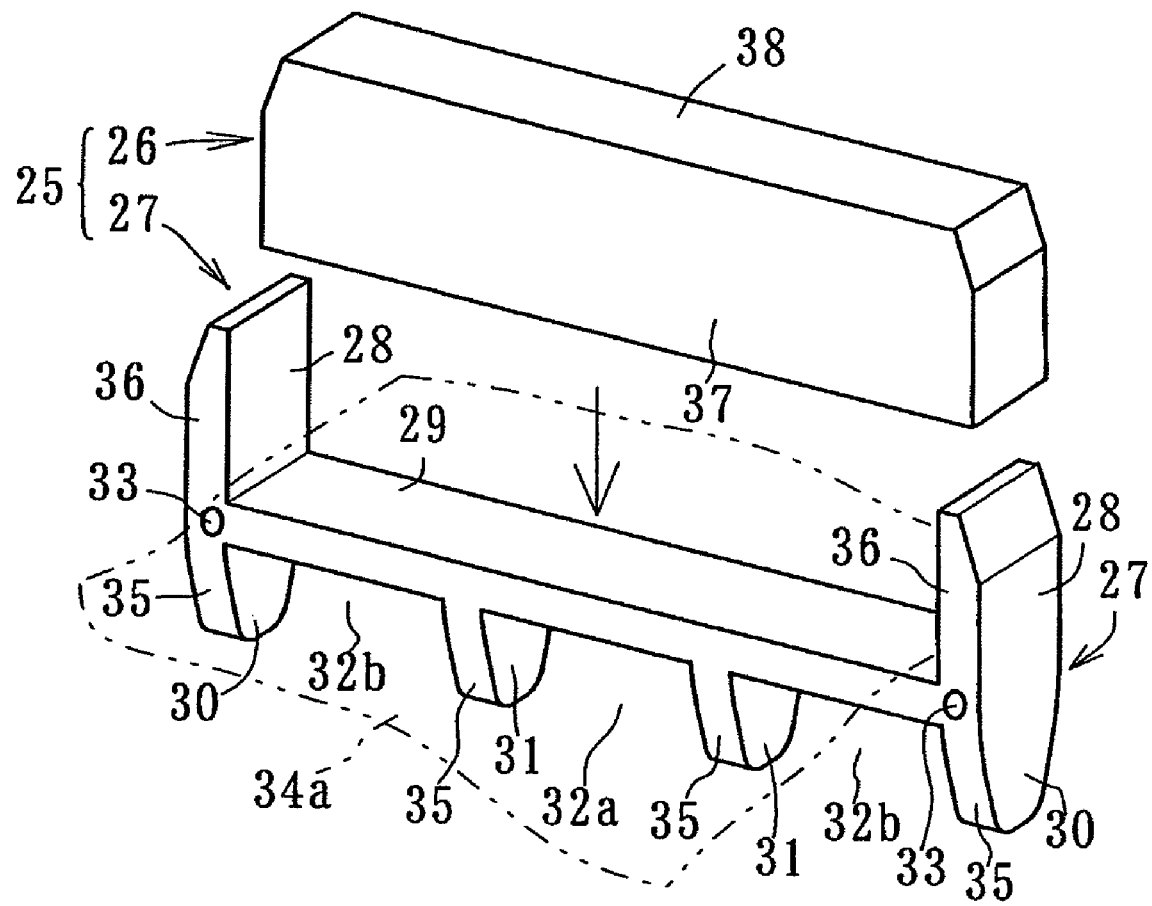
FIG. 7 is a view showing the assembly of the wrap-around member.
Figure 8:
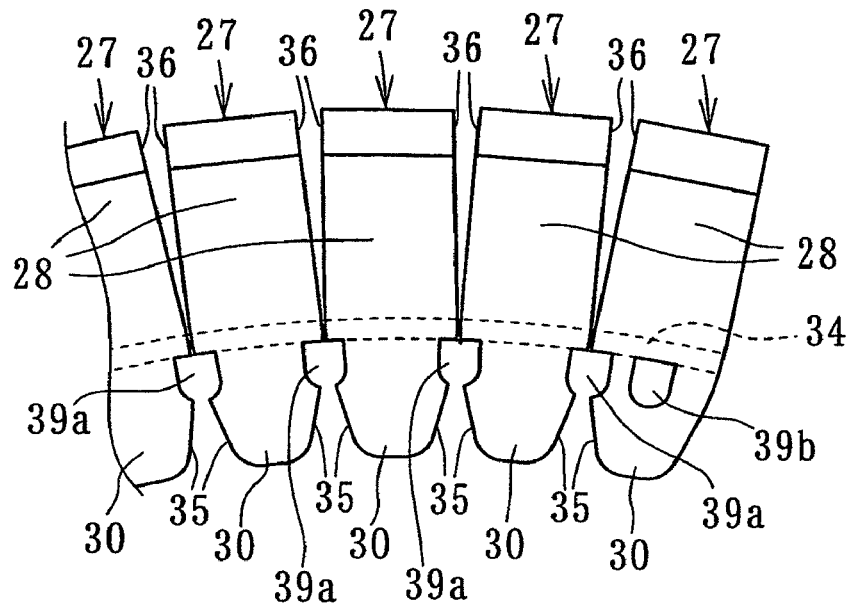
FIG. 8 is a view showing part of the wrap-around member in the inward bent condition.
Figure 9:
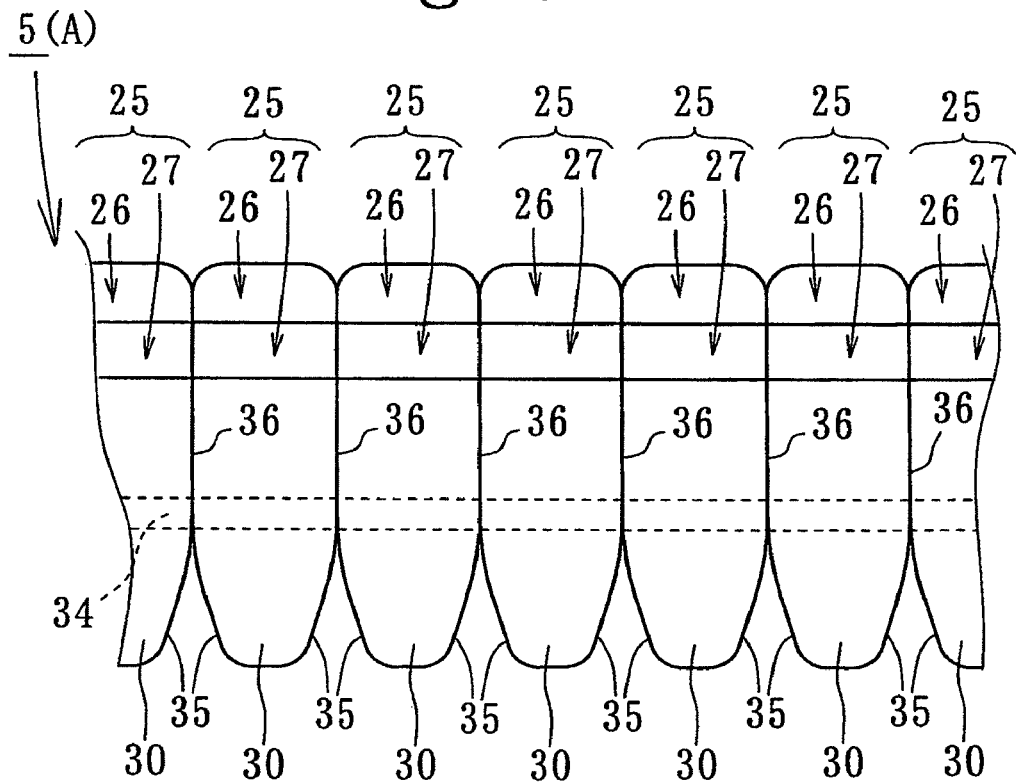
FIG. 9 is a view showing a line of the wrap-around member in a common tangent section.

The above and other objects, features and advantages of the present invention will become more apparent from the following description when taken in conjunction with the accompanying drawings A first embodiment of a caster of the present invention will now be described with reference to FIGS. 1 through 9. FIG. 1 is a side view of a caster, FIG. 2 is a view showing the caster climbing over a gap, and FIG. 3 is a cross-sectional view taken along line 3-3 of FIG. 2. FIG. 4 is a view showing a wrap-around member, FIG. 5 is an enlarged view showing one of pieces forming the wrap-around member, FIG. 6 is a cross-sectional view taken along line 6-6 of FIG. 5, FIG. 7 is a view showing the assembly of the wrap-around member, FIG. 8 is a view showing part of the wraparound member in the bent condition, and FIG. 9 is a view showing part of the wrap-around member in the straight condition.

Referring first to FIGS. 1 and 2, a caster 1 comprises a mounting leg 2, a first wheel 3 of a small diameter supported by the mounting leg 2, second wheels 4 of a large diameter supported by the mounting leg 2, and a wrap-around member wrapped around the first and second wheels 3 and 4.

The first wheel 3 is rotatably supported by an axle 6 on the mounting leg 2 and the second wheels 4 are rotatably supported by an axle 8 on one end of a suspension arm 7 of which the other end is coaxially supported by the axle 6 on the mounting leg 2 together with the first wheel 3.

The suspension arm 7 is a cantilevered member extending from the mounting leg 2 in a substantially horizontal position. Provided between the vicinity of the axle 6 of the suspension arm 7 and the mounting leg 2 is a suspension spring 9 which is adapted to absorb the vertical movement of the second wheels 4 due to the unevenness of the road surface. The suspension arm 7 can be a coil spring or various known springs made of metal, rubber or the like.

The first wheel 3 and the second wheels 4 are respectively made of suitable material such as metal or plastic and are provided to overlap in a side view as shown in the figures to make the caster 1 compact.

The caster 1 excels in performance when climbing over a gap 10 such as unevenness or stairs and can easily climb over even the gap 10 of which the height H is larger than the radius of the second wheels 4. This will be described later.

The mounting leg 2 is attached to a member 13 to be attached to a device such as a wheelchair by an upward projecting screw 12 through a joint 11. The screw 12 and the mounting leg 2 are provided to rotate around the axis line of the screw 12 by the joint 11. In other words, the caster 1 is freely rotatable type with the suspension.

Reference numerals 14a and 14b indicate an adjuster nut and an adjuster bolt and serve as part of a known tension adjustment mechanism 15 for optimizing the tension of the wraparound member 5 by adjusting the position of the axle 8 (see FIG. 2).

As shown in FIG. 3, the mounting leg 2 is formed with a substantially inverted U-shaped cross-section and the axle 6 is provided to bridge the vertical sections of the U. Each end of the axle 6 is fixed by a cap section 6a and a fixing means 6b such as a nut so that it does not drop out. The fixing means 6b can be a split pin or the like.

The first wheel 3 is rotatably supported on the center of the axle 6 in the longitudinal direction through a bearing 16 and positioned by the right and left washers 17 and 17 and the right and left collars 18 and 18 mounted on the outside of the axle 6.

The bearing 16 can be selected from various types of bearings such as a ball bearing, a needle bearing and a metal bearing. However, a collar can be used for the bearing depending on the circumstances. In this case, the first wheel 3 is positioned on the collar using an E-shaped clip.

Rotatably supported on each end of the axle 6 through collars 19 and 19 is one end of the suspension arm 7 of a substantially U-shape of which the right and left sides are integrally formed. The collars 19 and 19 are provided to engage the outer periphery of the axle 6 between the mounting leg 2 and the collar 18 and the suspension arm 7 is positioned on the axle 6 in the axial direction by a flange section of the collar 18 and the E-shaped clip.

The second wheels 4 are provided as a pair to sandwich the first wheel 3 and have a dual wheel structure which can withstand a large load. The supporting structure of the right and left second wheels 4 and 4 is the same as that of the first wheel 3 and both wheels 4 and 4 are rotatably supported on an axle 8 through bearings 21 and 21. The bearings 21 and 21 are positioned by a central collar 22, right and left washers 23 and 23, and right and left collars 24 and 24 and the axial direction of the bearings 21 and 21 is positioned and fixed between a cap section 8a of the axle 8 on one side and a fixing means 8b such as a nut on the other side.

The wrap-around member 5 consists of many independent pieces 25 which can be connected continuously in the circumferential direction and is formed of a ring or belt in its entirety. "Independent pieces 25" means that each piece 25 is in such a condition as to be capable of making a movement different from the adjacent piece on the outer and inner peripheral sides of the wrap-around member 5. In this case, each piece 25 can be an independent piece or part of an integral body.

The piece 25 is provided with a tire section 26 adapted to serve as a ground contact section and a wheel guide section 27 for supporting the tire section 26. The wheel guide section 27 is a comparatively rigid member made of plastic, metal or the like. As closely shown in FIGS. 5 and 6, the wheel guide section 27 is integrally formed with a pair of sidewalls 28 for supporting both sides of the tire section 26 and a connecting section 29 for coupling them together to support the bottom surface of the tire section 26.

The wheel guide section 27 is further provided with a pair of guide walls 30 and 30 consisting of parts where the sidewalls 28 and 28 extend inward over the connecting section 29. Formed at certain intervals between these guide walls 30 and 30 is a pair of ribs 31 and 31 which integrally project from the connecting section 29. A guide groove 32a is formed between the pair of ribs 31 and 31 and the outer peripheral section of the first wheel 3 is fitted into this groove 32a.

Further, formed between the guide walls 30 facing each rib 31 is a guide groove 32b into which the outer peripheral section of the second wheel 4 is fitted. The guide groove 32b is formed in pairs on both sides of the guide groove 32a and corresponds to the right and left second wheels 4 and 4. These guide grooves mutually position the first and second wheels and the wraparound member 5.

A connecting hole 33 penetrating the wheel guide section 27 in the circumferential direction of the mounting leg 2 within the thickness of the connecting section 29 continuing perpendicular to the direction of the axis of rotation of the wheel is provided. A connecting member 34 made of a resinous cord such as Nylon and Kevlar or a metal wire such as a piano wire is inserted into the connecting hole 33. The number of connecting holes 33 is arbitrary. The connecting holes are formed on both ends in the figure, but the number of holes can be selectively set, wherein even one, three or four holes are acceptable in accordance with the intended use.

As shown in FIGS. 4 through 8, the wrap-around member 5 according to the present embodiment consists of many independent pieces 25 which are continuous in the circumferential direction and are connected by the connecting member 34. The wrap-around member 5 is formed of a ring or a belt continuous in the circumferential direction. As shown in FIG. 4, the wrap-around member 5 is provided to bend along the outer periphery of the first and second wheels 3 and 4. In other words, the wrap-around member 5 can bend inward, but it becomes straight on the common tangents C1 and C2. As described later, the part of the wrap-around member 5 in the straight condition becomes an outward inflexible area A (see FIG. 4) where the inward depression D as shown by an imaginary (virtual) line is prevented.

The connecting member 34 is not limited to the linear member as stated above, but can be selected from the various shapes. For example, as shown by an imaginary line in FIGS. 6 and 7, it can be a sheet belt 34a in which a cloth such as Kevlar or a belt-shaped member made of adequate metal is formed in a ring shape. If this sheet belt 34a is put on the connecting section 29 and coupled together by adhesive bonding etc., then the tire section 26 is fitted between the connecting section 29 and the side walls 28 for integration, each piece 25 can be connected in the ring shape by the sheet belt 34a. In this case, since the connecting hole 33 can be omitted, it is possible to make the connection of each piece 25 simple and fast.

As shown in FIGS. 5, 8 and 9, the guide wall 30 of the wheel guide section 27 is provided in such a manner that both ends in the circumferential direction are inclined toward the inner peripheral side to approach each other, thereby forming an inclined surface section 35. The guide wall 30 is therefore provided on the inward tip side with a tapered narrow section relative to the sidewall 28. On the other hand, the sidewall 28 of the guide wall 30 on the outer peripheral side has a wide section having the same width as the maximum width of the guide wall 30. Further, the inclined surface sections 35 and 35 between the adjacent pieces 25 and 25 form a substantially inverted V-shaped groove to permit the inward bending of the wrap-around member 5. Each rib 31 also has the same shape as the guide wall 30.

Each end of the sidewall 28 in the circumferential direction is provided with a contacting section 36 of a linear shape running parallel to each other. As shown in FIG. 9, when the wrap-around member 5 is in a straight condition, this section is provided in such a manner that the facing contacting sections 36 and 36 of the adjacent wheel guide sections 27 and 27 contact each other to close a gap to prevent the wraparound member 5 from further bending outwards to warp. In this manner, this contacting section 36 serves as a warp preventing contacting section and thus, the contacting sections 36 and 36 of the wheel guide section 27 on the right and left sides function in the same manner.

The tire section 26 of a block shape made of comparatively soft material such as rubber is fitted between the right and left sidewalls 28 and 28 and the right and left sides and the bottom surface are integrated by adhesive bonding etc. The side surfaces 37 of the tire section 26 in the front and rear direction (the circumferential direction of the wraparound member 5 is hereinafter referred to as "the front and rear direction") are flat surfaces parallel to each other and serve as the warp preventing contacting section in the same manner as the right and left contacting sections 36 of the wheel guide section 27. The outer peripheral section 38 of the tire section 26 is chamfered on the right and left sides of the outer peripheral section and serves as a section for contacting the ground as the tire section for the caster 1.

As shown in FIG. 7, the piece 25 is made in such a manner that the wheel guide section 27 and the tire section 26 are respectively made in advance as separate bodies and the tire section 26 is fitted between the sidewalls 28 of which the right and left sides are facing and then secured on the inner surfaces of the sidewalls 28 and the cross section 29 by adhesive bonding etc. In this case, the side surfaces 37 of the tire section 26 in the front and rear direction are flush with the contacting sections 36 of the sidewalls 28 as shown in the side surface of the installation condition (see FIG. 7).

As shown in FIG. 8, in the case where the wrap-around member 5 bends on the inner peripheral side, the adjacent pieces 25 can freely bend without causing interference with each other because the side surface of the guide wall 30 is provided with the inclined surface section 35. Reference numerals 39a and 39b in the figure are sweep holes for eliminating dirt or dust clogged between the adjacent pieces 25. As shown by the reference numeral 39a, one hole can be formed between the adjacent guide walls 30 and 30 or an independent hole like 39b can be formed for each guide wall 30.

FIG. 9 shows a line of the piece 25 on the common tangent section and each piece 25 is horizontally arranged in a substantially straight condition on the common tangents C1 and C2 (see FIG. 4). In the strict sense, this line is formed in a very large radius. If the vertical ends of each piece 25, for example, the inner peripheral ends of the guide wall 30 are lined up along this radius, the contacting sections 36 and 36 of each side wall 28 in the adjacent pieces 25 and 25 and the side surfaces 37 and 37 of each tire section 26 in the front and rear direction contact each other to prevent warping. Thus, this makes the inward bending of the wrap-around member 5 impossible as shown by an imaginary (virtual) line in FIGS. 2 and 4, thereby preventing the depression or outward bending.

In other words, the wrap-around member 5 only permits the substantially straight line condition in which the tire section 26 forming the outer peripheral section of each piece 25 and the sidewall 28 of the wheel guide section 27 as shown in FIG. 9 contact each other and the condition in which the adjacent tire sections 26 and 26 and sidewalls 28 and 28 of each piece 25 open to permit the wrap-around member 5 to bend on the inner peripheral side in its entirety as shown in FIG. 8, thereby making warping, in which one part of the wraparound member 5 is depressed inwards and the other part in the front and rear relation bends on the outer peripheral side, impossible.

Since a section of the wrap-around member 5 corresponding to the lower common tangent section C2 is an area in which the outward bending is prevented even in the case of contacting the gap 10, this section is referred to as an outward inflexible area A. This outward inflexible area A is formed of the large radius which forms part of an imaginary wheel W. This imaginary wheel W is an imaginary circle with an extremely large diameter having a radius common with the large radius that is almost a straight line. In the case where the caster 1 passes the gap, this imaginary wheel W is regarded as the caster 1 and it is possible to consider this a condition substantially the same as that the imaginary wheel W climbing over the gap 10.

The operation of this condition will now be described. FIG. 1 is a normal condition before passing the gap in which the mounting leg 2 is pushed up by means of the suspension spring 9, the axle 6 is provided in a higher position than the axle 8, and the outward inflexible area A of the wraparound member 5 corresponding to the common tangent section contacts the gap 10. An approach angle alpha which is the angle at which this area contacts the gap is also a ground surface angle.

In this condition, if the caster 1 advances toward the gap 10, the side of the axle 8 of the suspension arm 7 swings in the clockwise direction of FIG. 2 because the outward inflexible area A contacting the gap 10 does not bend outwards. As a result, the second wheel 4 leaves the ground against the suspension spring 9 and the caster 1 climbs over the gap 10 in this condition.

In this case, the outward inflexible area A changes position in accordance with the swing of the suspension arm 7 and the approach angle beta is smaller (alpha beta). Accordingly, when the wheel weight w of the outward inflexible area A contacting the gap 10 is converted to a horizontal force F and a tangential force f, the horizontal force F serving as an impelling force becomes larger as the approach angle changes from alpha to.crclbar. and the common tangent C2 also changes position down. In this manner, the caster 1 can climb over the gap 10 with smaller power to provide a good climbing performance, thereby improving the gap climbing performance.

This means that the caster 1 can lightly climb over the gap which became relatively small with less power because the area of the wraparound member 5 contacting the gap becomes a very large radius, the imaginary wheel W using the R as part of the outer diameter becomes extremely large, and the gap is traversed by such a huge imaginary wheel W. If the suspension arm 7 swings as shown in FIG. 2, the imaginary wheel W assumes in such a condition as to climb over the gap which is further lowered and as a result, the climbing performance improves further.

This gap climbing is possible until the height H of the gap 10 reaches the higher limit position of the outward inflexible area A. In other words, the caster can climb over the gap up to a height close to the axle 6 of the first wheel 3 and shows excellent climbing performance compared to a conventional endless belt. Further, in the present embodiment, the axle 6 is provided in a higher position than the axle 8 and the first wheel 3 of a smaller diameter is provided to increase the ground surface angle alpha of the common tangent C2 in the normal condition. In this manner, it is possible to increase an angle of attack against the gap 10 and make the gap climbing easy.

As described above, many independent pieces 25 are coupled together in the circumferential direction to form the wrap-around member 5. Each piece 25 is provided with an outer peripheral section and an inner peripheral section adapted to be moveable independent of the adjacent pieces 25 by the tire section 26 and the wheel guide section 27. Provision of the outer peripheral section and the inner peripheral section makes inward bending of the wrap-around member 5 possible and prevents the wrap-around member 5 from warping, thereby preventing generation of the partial depression D thereof when climbing over the gap. In this manner, since the common tangent section C2 of the wrap-around member 5 can maintain the substantially straight condition when climbing the gap, it serves as an anti-sticking plate. With this arrangement, the wrap-around member 5 can smoothly climb over the gap 10 and the gap climbing performance improves.

Further, since this warp preventing function can be realized by the structure of the wrap-around member 5 itself, there is no necessity to provide separate presser rollers and presser plates inside the wrap-around member 5. In this manner, it is neither necessary to provide these presser members nor to support them. As a result, it is possible to make the structure simple, make the caster compact in its entirety to save weight, and reduce the costs.

Still further, in the area of the wrap-around member 5 close on the common tangents C1 and C2 of the first and second wheels, the outer peripheral sections of the adjacent pieces 25 contact each other to exhibit the warp preventing function. Accordingly, it is possible to maintain the substantially straight condition as-is in the area close on the common tangents C1 and C2 where there is normally a straight condition. However, since the lower common tangent C2 affects the gap climbing performance, the following description will be made only regarding the common tangent C2.

Since each piece 25 is independently formed, it is possible to easily fabricate the wrap-around member 5 by coupling these pieces 25 together by a suitable connecting member 34 in a ring shape. It is also possible to partially exchange the pieces 25 and adjust the length of the wrap-around member 5.

Since the piece 25 is provided with the tire section 26 and the wheel guide section 27, a good ground contact performance can be secured by the tire section 26 and the disengagement of the first wheel 3 from second wheel 4 can be prevented by the wheel guide section 27 to secure satisfactory transmission of rotation.

Further, since the tire section 26 is separately formed from the wheel guide section 27, it is possible to provide a free combination of the tire section 26 with the wheel guide section 27 such as the exchange of the tire section 26 in accordance with the intended use and thus freely change the performance.

Since the first and second wheels 3 and 4 are provided to overlap in the side view, it is possible to make the caster compact in its entirety. Further, since the first and second wheels 3 and 4 have different diameters and a plurality of second wheels 4 of a larger diameter is provided in the direction of the rotational axis, it is possible to consolidate the second wheel 4 of the larger diameter which serves as a main body for supporting a load.

Further, since the second wheel 4 is provided with a suspension mechanism, smooth gap mounting can be realized.

Since the direction can also be freely changed, it is possible to easily pass over the gap even in this respect. Still further, since the direction can be freely changed, running becomes easier.

Figure 10:
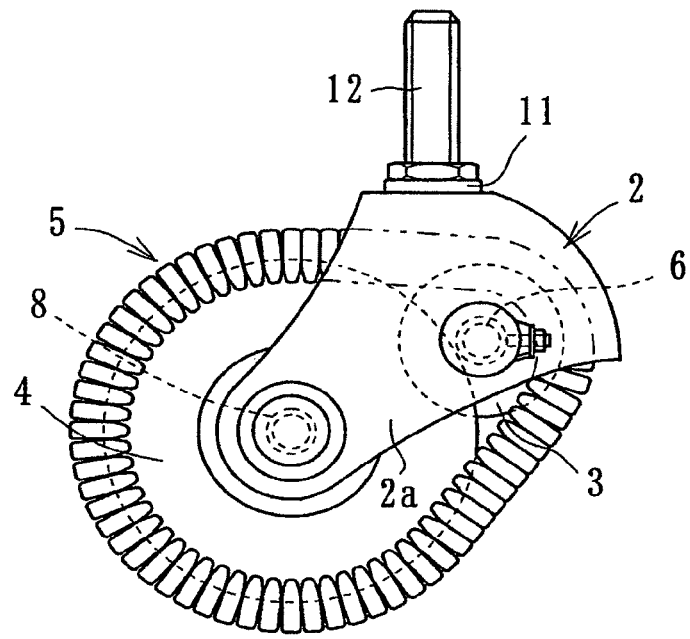
FIG. 10 is a view similar to FIG. 1 according to a second embodiment.
Figure 11:
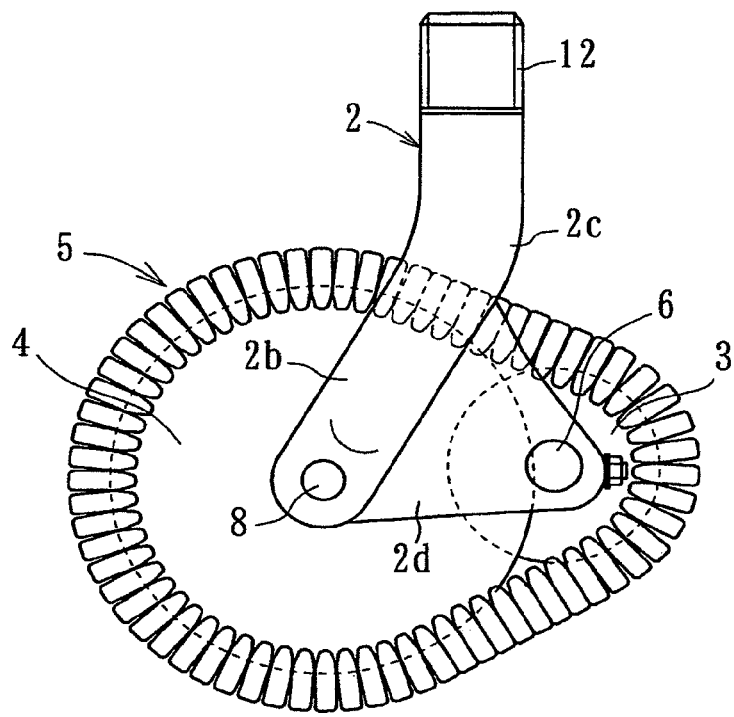
FIG. 11 is a view showing a variation according to the second embodiment.

A second embodiment will now be described hereunder. FIGS. 10 and 11 are side views of a caster of a simplified type without a suspension. In the case of FIG. 10, a first wheel 3 is supported by an axle 6 at the intermediate section of a side surface 2a of a mounting leg 2 with a substantially C-shaped cross-section, while a second wheel 4 is supported by an axle 8 at the tip of the mounting leg 2 which extends to the lower left. Other structures, the first wheel 3, the second wheel 4 and the wraparound member 5 are the same as above or can be combined with various embodiments described below regarding the wrap-around member 5.

In this manner, by omitting the suspension, the first and second wheels 3 and 4 can be rigidly supported by a single mounting leg 2. Thus, it is possible to reduce the number of parts and provide a simplified structure. According to this type, an angle between the line drawn from the axle 6 to the axle 8 and a horizontal line is comparatively large and the position of the axle 6 is considerably higher than that of the axle 8. Accordingly, the caster of this type is suitable for use in a shopping cart for physically unimpaired people which requires comparatively large power, but is capable of climbing over a large gap.

FIG. 11 also shows a rigid type caster, but in this case, the mounting leg 2 is made of a bent pipe member 2b. The second wheel 4 is supported by the axle 8 on the tip of a bent section 2c of the pipe member 2b, while the first wheel 3 is supported by the axle 6 on a bracket 2d which projects backwards from the bent section 2c. According to this type, it is also possible to provide a further simplified structure. In addition, the axle 6 is situated close by and substantially at the same level as the axle 8 and an angle between the line from the axle 6 and the axle 8 and the horizontal line is extremely small. Accordingly, the caster of this type is suitable for use in a wheelchair for physically handicapped or aged people which can climb over a gap of a certain size with the smallest possible amount of power.

In the case of either FIG. 10 or 11, since the ground surface angle of the outward inflexible area A is constant, the angle is determined by setting the mounting position of the axles 6 and 8 in advance. When the axle 6 is lowered, the gap climbing performance improves because the approach angle alpha becomes small. If the mounting position of the axle 6 is set by manual adjustment or power assisted through a worm gear and the like in the vertical direction and the like of the figure, the approach angle can be more freely set. Mechanism for changing direction can be freely selected for each type.

Figure 12:
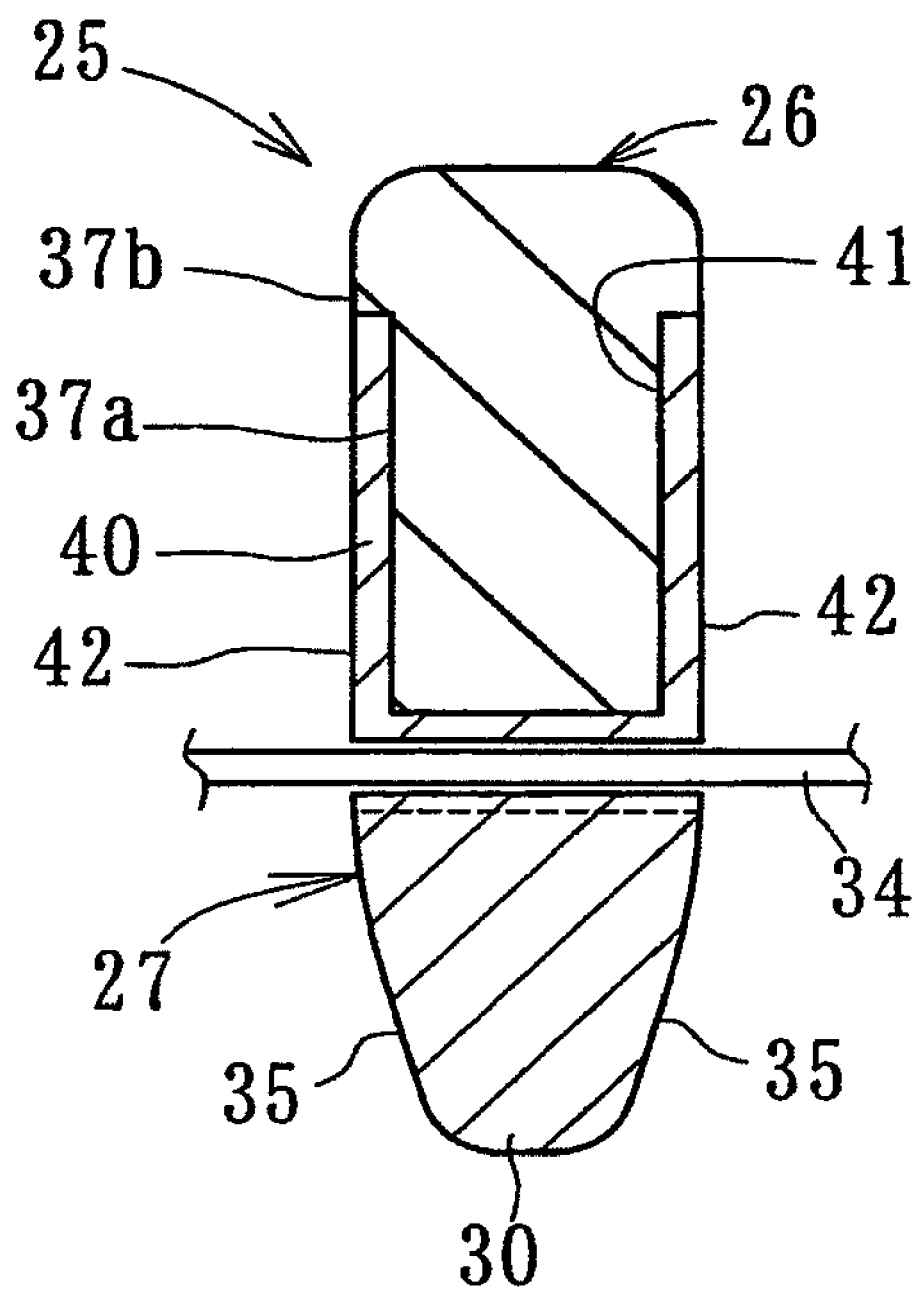
FIG. 12 is a cross-sectional view of one piece in the circumferential direction according to a third embodiment.
Figure 13:
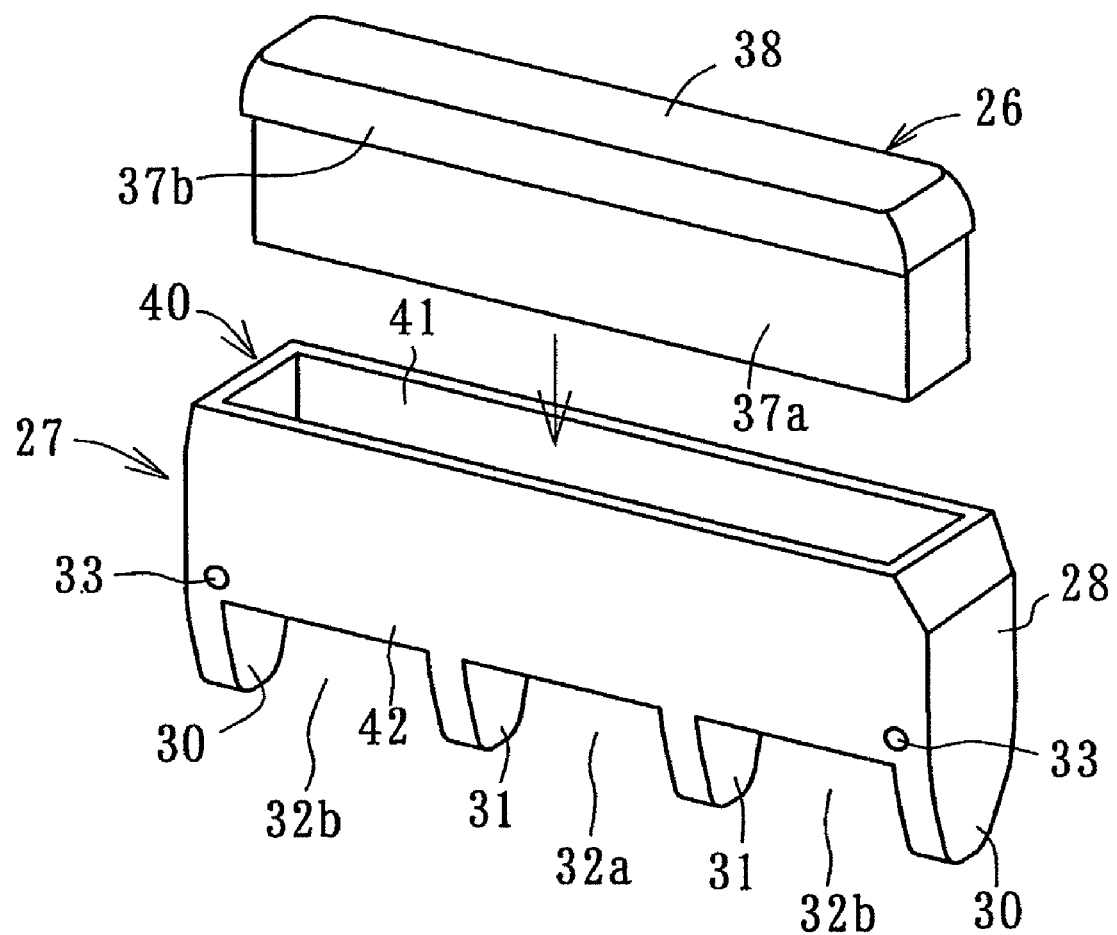
FIG. 13 is a view showing the assembly of a wrap-around member according to the third embodiment.

FIGS. 12 and 13 show a third embodiment. This and the following embodiments relate to variations of the wrap-around member 5 in the structure. These variations can be selectively combined for the caster 1 of the types in various embodiments described above.

FIG. 12 shows a cross-section of one piece 25 in the circumferential direction and FIG. 13 shows its assembling method. A wheel guide section 27 in this embodiment is integrally formed with a box-shaped securing section 40. The box type securing section 40 opens upwards in the figure and the lower half side of the tire section 26 is fitted into this opening section 41.

The side of the tire section 26 in the front and rear direction is formed with a step 37a which is lowered into the box-shaped securing section 40 according to the thickness. When combined, this step 37a is fitted into the box-shaped securing section 40 and the lower end of an upper section 37b is combined with the open end of the box-shaped securing section 40 so that the upper section 37b is flush with the front and rear sides 42 of the box-shaped securing section 40 (see FIG. 12).

The other structures of the wheel guide section 27 on the side of guide grooves 32a, 32b and 32b are the same as those of the foregoing embodiments. In this manner, the tire section 26 can be positioned only by fitting it into the open section 41 of the box-shaped securing section 40. Accordingly, it is possible to prevent the tire section 26 from coming loose to maintain the outer diameter of the imaginary wheel. Also, since the front and rear sides 42 of the adjacent box-shaped securing sections 40 contact each other, it is further possible to positively maintain the outer diameter. It is also possible to make assembling easy.

Figure 14:
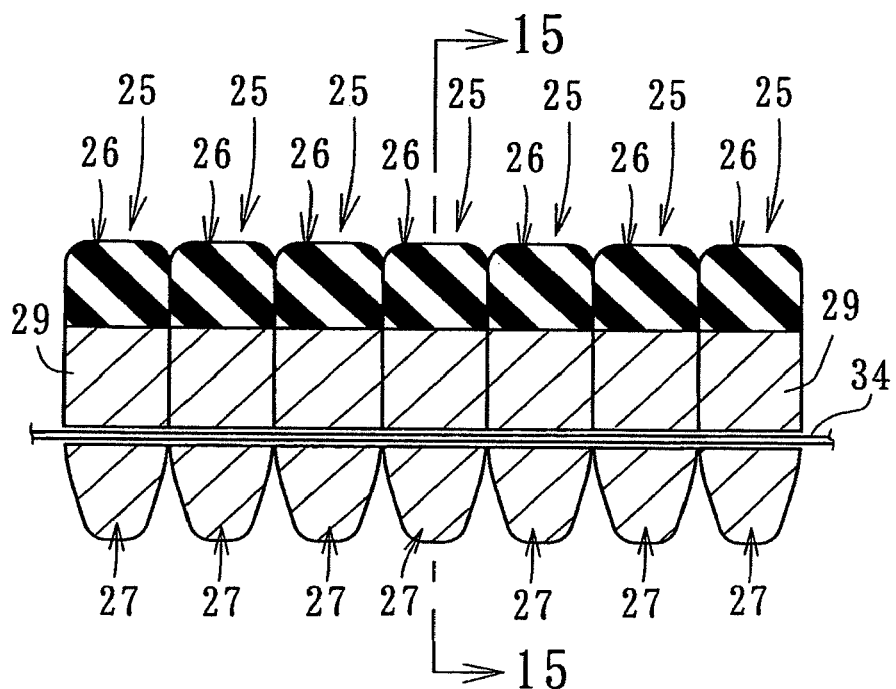
FIG. 14 is a cross-sectional view of part of an outward inflexible area in the circumferential direction according to a fourth embodiment.
Figure 15:
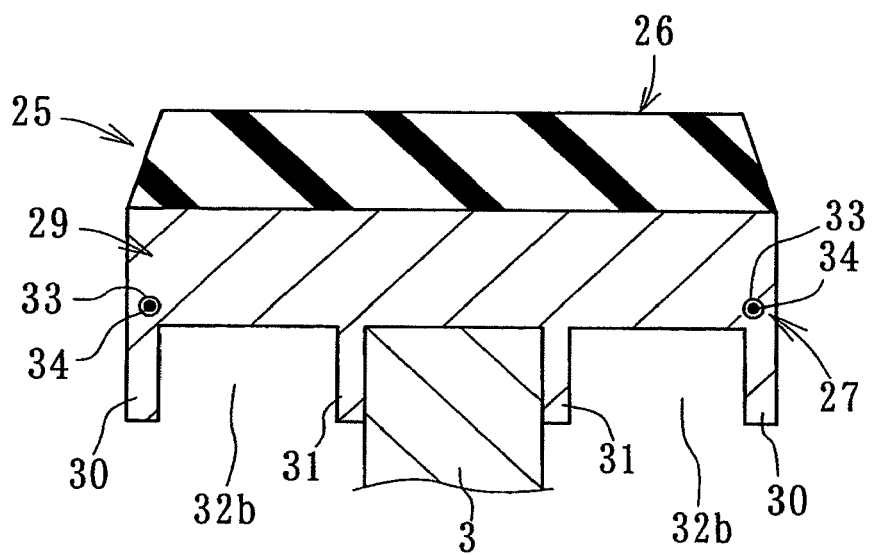
FIG. 15 is a cross-sectional view taken along line 15-15 of FIG. 14.

FIGS. 14 and 15 show a fourth embodiment. FIG. 14 is a cross-sectional view of part of the wrap-around member 5 in an outward inflexible area A in the circumferential direction and FIG. 15 is a cross-sectional view taken along line 15-15 of FIG. 14. The wheel guide section 27 according to the present embodiment corresponds to a structure in which the section above the connecting section 29 of the wheel guide section in each of the foregoing embodiments is omitted, wherein the lower surface of the tire section 26 of which the thickness in the height direction is reduced is combined with the upper surface of the connecting section 29, of which the thickness in the height direction is increased, by adhesive bonding and the like for integration. In this manner, it is possible to provide the most simplified wheel guide section 27.

Figure 16:
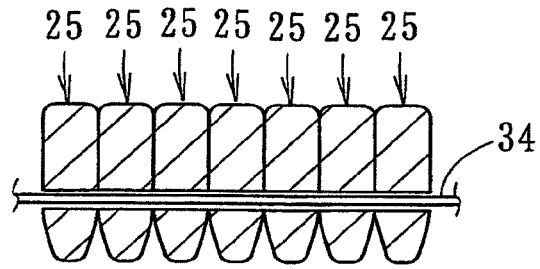
FIG. 16 is a view corresponding to FIG. 14 according to a fifth embodiment.
Figure 17:
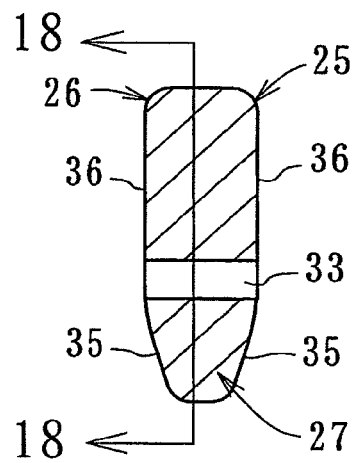
FIG. 17 is a view similar to FIG. 12 according to the fifth embodiment.
Figure 18:
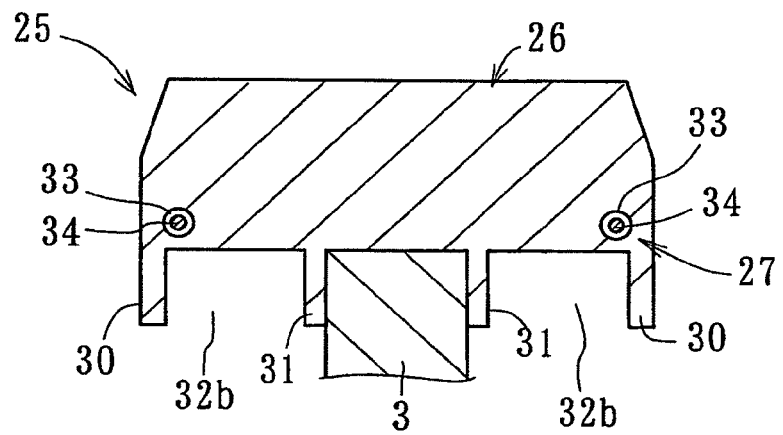
FIG. 18 is a cross-sectional view taken along line 18-18 of FIG. 17.

A fifth embodiment will now be described with reference to FIGS. 16 through 18. FIG. 16 is a view corresponding to FIG. 14, FIG. 17 is a cross-sectional view of one piece 25 in the circumferential direction, and FIG. 18 is a cross-sectional view taken along line 18-18 of FIG. 17. In this example, the piece 15 is made of the same material such as hard rubber and metal in its entirety, wherein a wheel guide section is integrally formed with a tire section. In this case, the outer peripheral side of the piece 25 is a tire section 26, the inner peripheral side thereof is a wheel guide section 27, and the intermediate section between them corresponds to a connecting section. An inclined section 35 and a contacting section 36, a connecting structure using a connecting hole 33 and a connecting member 34, and a wheel guide structure are the same as above. In this manner, it is possible to provide the piece 25 with the most simplified structure.

Figure 19:
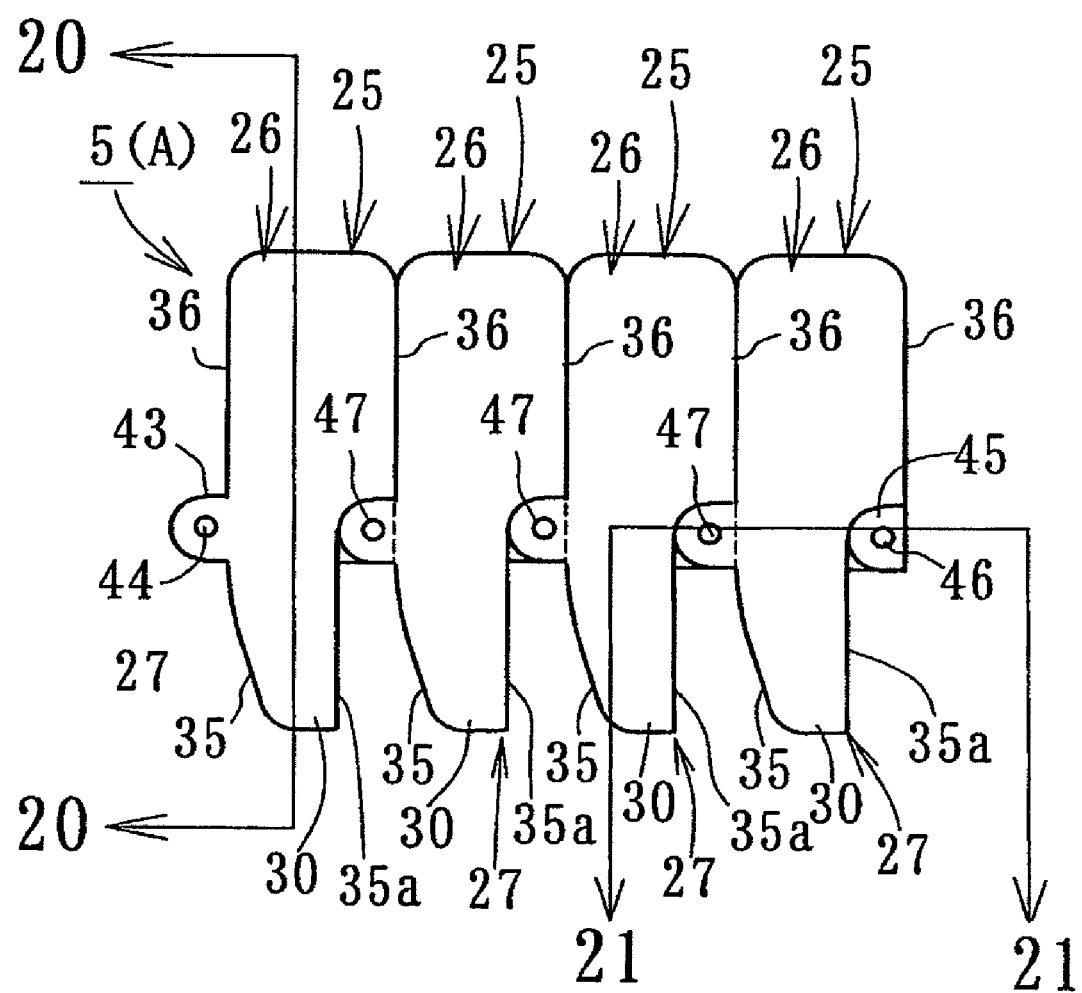
FIG. 19 is a view similar to FIG. 9 according to a sixth embodiment.
Figure 2:
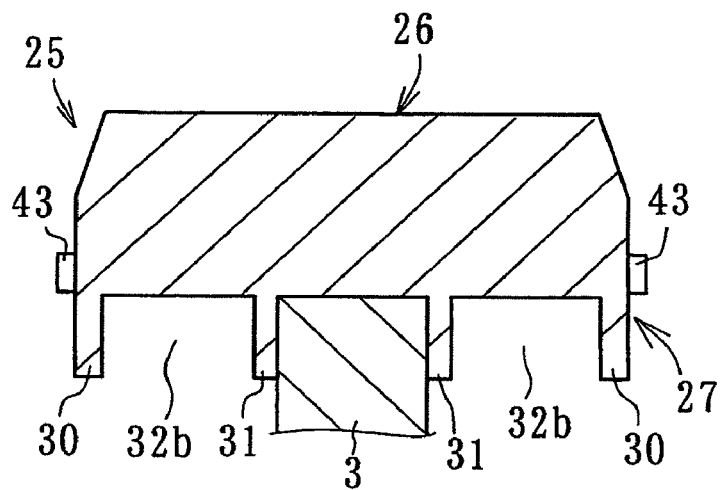
Figure 2:
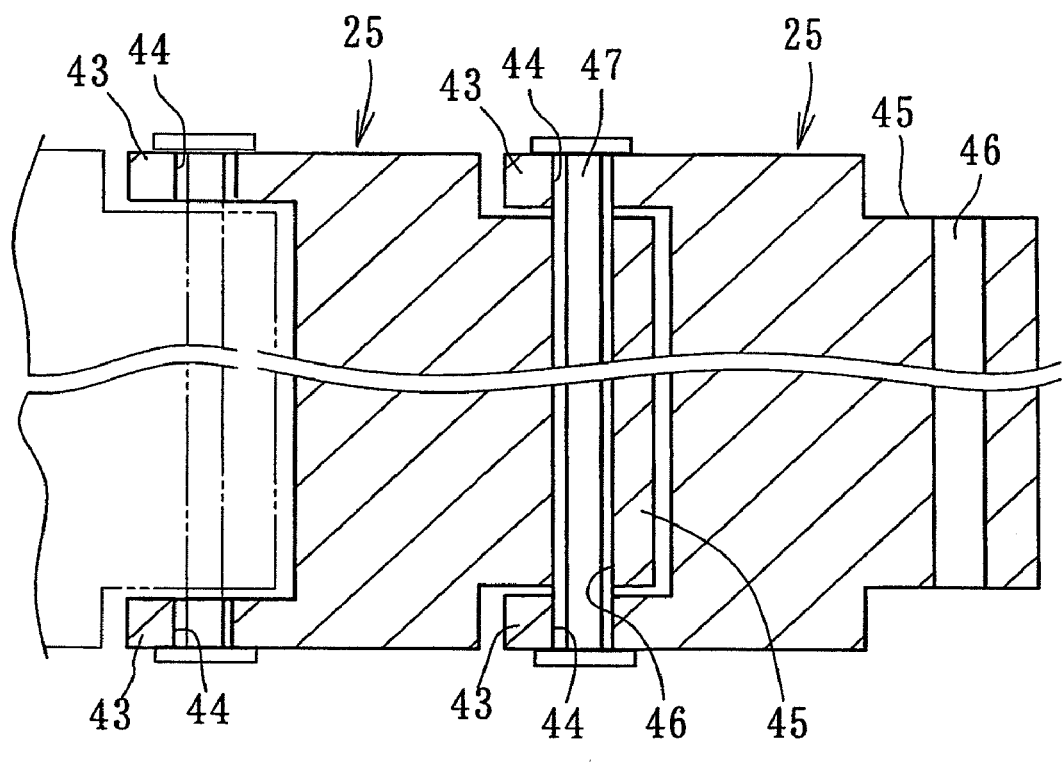
Figure 2:
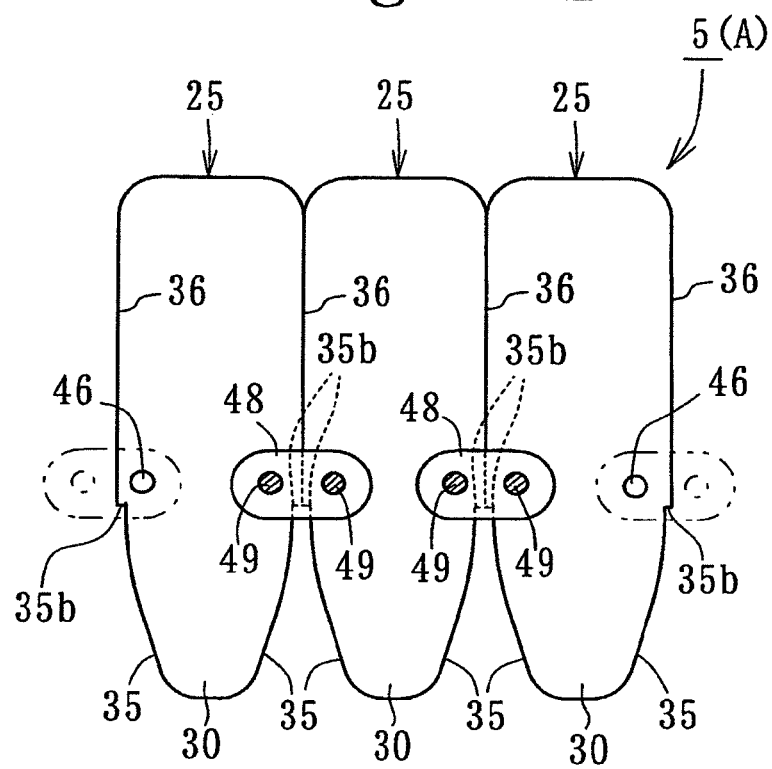
Figure 2:
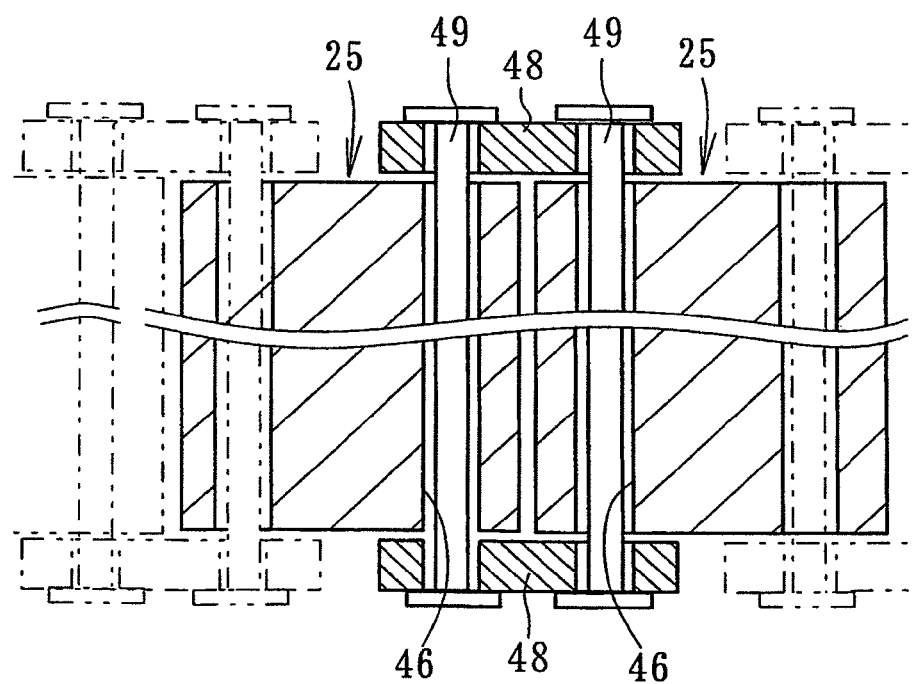

FIGS. 19 through 21 relate to a sixth embodiment. FIG. 19 is a view showing a partial side of the outward inflexible area A, FIG. 20 is a cross-sectional view taken along line 20-20 of FIG. 19, and FIG. 21 is a cross-sectional view taken along line 21-21 of FIG. 19. In this example, each piece 25 is also made of the same material, but provided with, for example, protrusions 43 protruding on the right and left sides. These protrusions 43 are superimposed on depressions 45 formed on the rear section of the side of the front and rear pieces 25 to allow an eyehole 44 to correspond to a through-hole 46 on the side of the depression 45 and coupled by an axle 47. In this case, an inclined section 35 having an inclined surface provided in pairs in the foregoing embodiments is provided only on one side and the other side is provided with a substantially vertical notch section 35a which serves as a clearance section to avoid interference with the inclined section 35 of the adjacent piece 25 when bent inward.

In this manner, it is possible to assemble the wraparound member 5 by interconnecting the adjacent pieces 25 as seen in the conventional metal chain and omit the connection by the ring shaped connecting member 34 such as resin cord and metal wire as seen in each of the foregoing embodiments. It is to be noted that this connecting method can be applied to each type of the foregoing embodiments in place of the connecting member 34.

FIGS. 22 and 23 show a seventh embodiment having a similar connecting method to the above. FIG. 22 is a view corresponding to FIG. 19 and FIG. 23 is a view corresponding to FIG. 21. In this example, a connecting plate 48 is provided to bridge the adjacent pieces 25 and is connected by a connecting shaft 49 inserted into a through-hole 46. The upper end of the inclined section 35 is provided with a step 35b which is cut into the body section of the piece 25 to provide a wide groove which serves as a clearance section between the facing inclined section 35 and 35 to avoid interference with the inclined sections 35 of the adjacent pieces 25 when bent inwards. In this case, since the piece 25 can be made in a symmetric figure including the front and rear direction, assembly can be made even though the pieces 25 are exchanged in the front and rear direction. This example can also be applied to each type of the foregoing embodiments.

Figure 25:
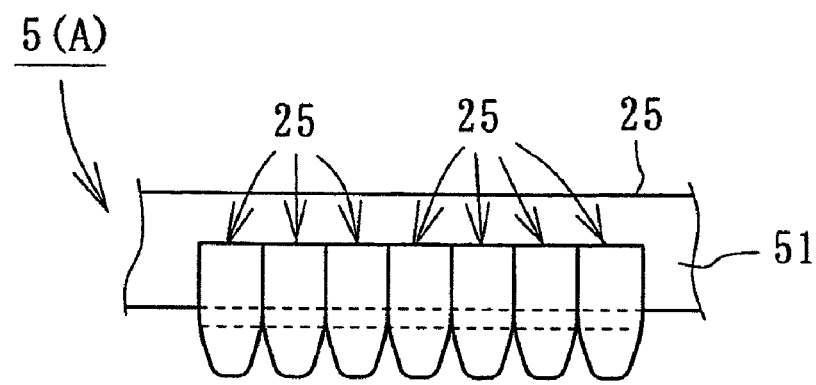
FIG. 25 is a view similar to FIG. 9 according to the eighth embodiment.
Figure 26:
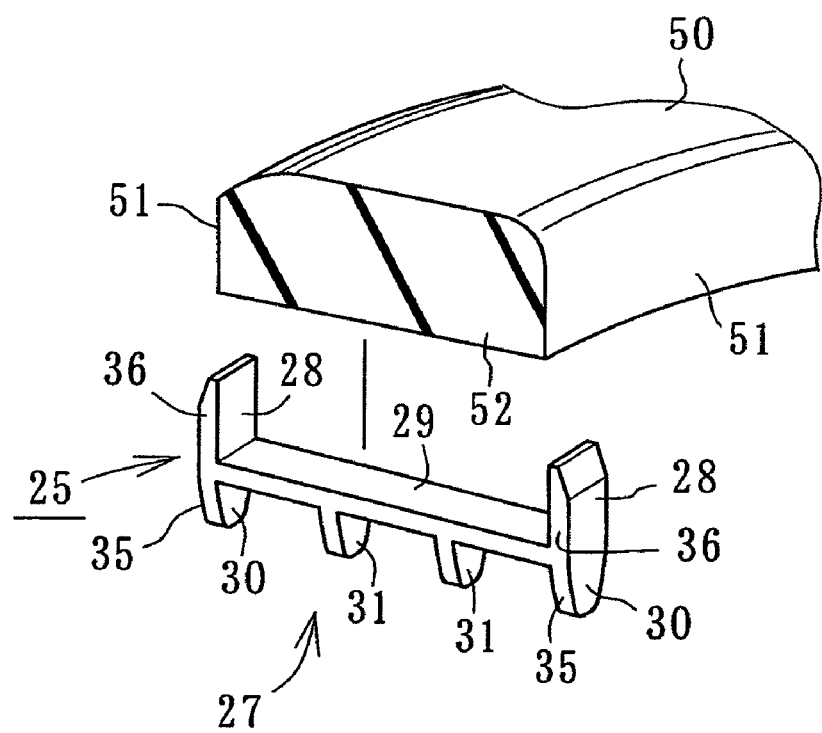
FIG. 26 is a view similar to FIG. 7 according to the eighth embodiment.
Figure 2:
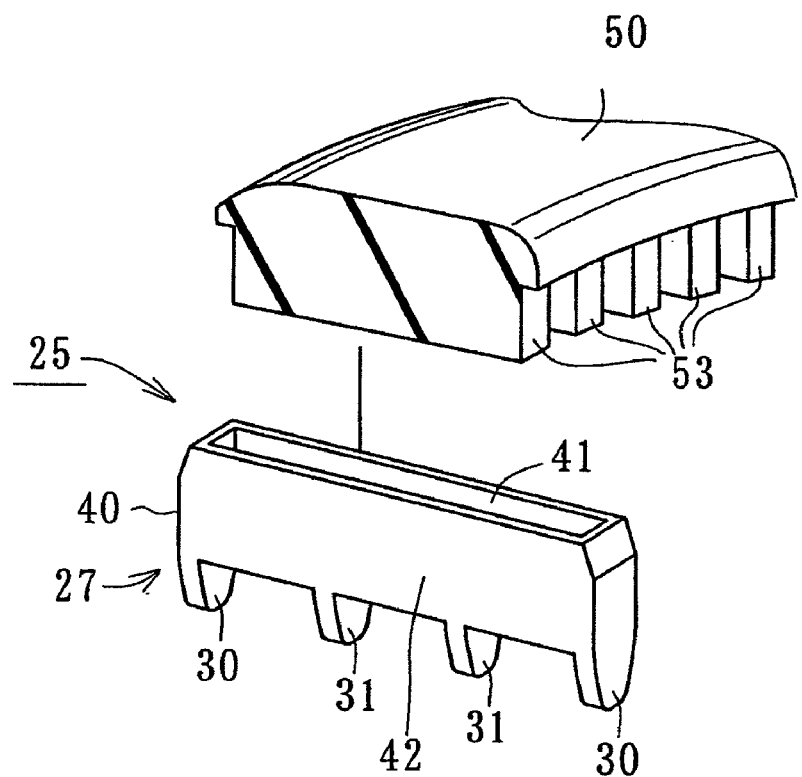
Figure 2:
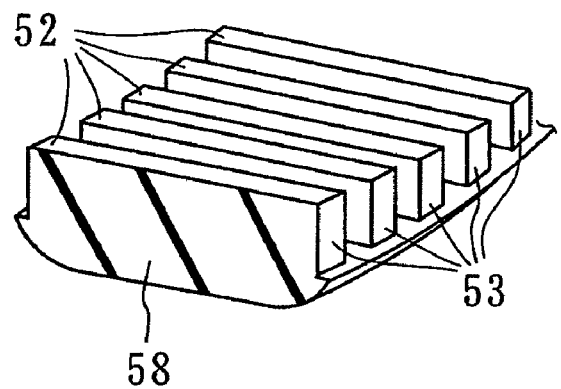

FIGS. 24 through 32 relate to an eighth embodiment, in which a piece is made separately from a tire section and composed of a wheel guide section provided with sidewalls 28 which are coupled with the tire section. The tire section is formed of an endless belt. FIG. 24 is a side view showing a wraparound member 5 in its entirety, FIG. 25 is view showing part of an outward inflexible area A, and FIG. 26 is a view showing an assembling method. In this example, the tire section is formed of the continuing endless belt 50. The endless belt 50 is made of a suitable material such as rubber and each piece 25 is mounted in order on the side of the endless belt in the longitudinal direction.

Each piece 25 is formed independently and for example, the structure similar to the wheel guide section 27 in the first embodiment can be used. As shown in FIG. 26, the sides 51 of the endless belt 50 in the width direction and the bottom surface 52 are inserted between the sidewalls 28 and secured to the inner surface of the sidewalls 28 and the upper surface of a cross section 29 by means of adhesive bonding or the like. In this case, the piece 25 is composed only of the wheel guide section 27 which is made separate from the endless belt 50 and the outer peripheral section having a warp preventing function consists of the cross section 29 and the sidewalls 28 of the wheel guide section 27.

The inner peripheral section of the piece 25 consists of guide walls 30 and ribs 31 of the wheel guide section 27. To facilitate bending of the outer peripheral section during inward bending, for example, the endless belt 50 can be formed of a laminated structure in which the material becomes softer on the outer peripheral side to make the elongation of the outer peripheral side easy. It is also possible to provide a slit on the outer peripheral side.

Further, as shown in FIG. 27, the wheel guide section 27 with a box-shaped securing section 40 in the third embodiment can also be used as the piece 25. The bottom surface side of the endless belt 50 is shown in FIG. 28. In this case, a bottom surface 52 is integrally formed at regular intervals in the longitudinal direction with a protrusion 53 adapted to closely fit into an opening section 41. The protrusion 53 is fitted into the opening section 41 for integration. The structure of the piece 25 in this case is the same as in FIGS. 25 and 26 and the outer peripheral section having the warp preventing function corresponds to the box-shaped securing section 40 of the wheel guide section 27, wherein the front and rear sides 24 of the box-shaped securing section 40 contact the front and rear sides 42 of the adjacent box-shaped securing section 40 in their entirety.

This arrangement makes positioning of the wheel guide section 27 easy. Since assembly can be realized only by mounting the wheel guide section 27 on the common endless belt 50, assembly and production become easy. According to this example, in the outward inflexible area A, only the contacting sections 36 (FIG. 26) or the front and rear sides 42 (FIG. 27) of the adjacent wheel guide section 27 come into contact, but even these sections can fully prevent the outward bending of the wraparound member 5. As described in FIGS. 12 and 13, the warp preventing function can be positively exhibited if the wheel guide section 27 is provided with the box-shaped securing section 40.

Figure 29:
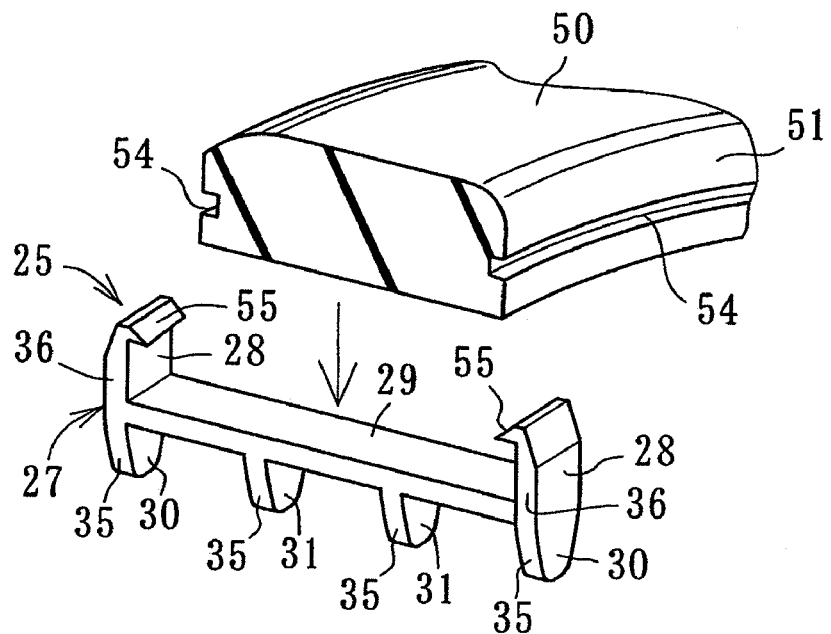
FIG. 29 is a view similar to FIG. 26 showing still another example according to the eighth embodiment.
Figure 30:
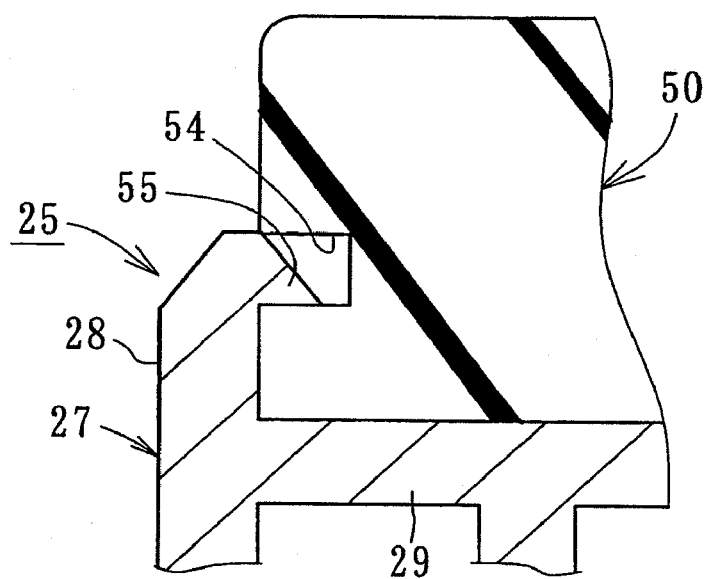
FIG. 30 is a cross-sectional view showing an engaging section of the example of FIG. 29.

FIGS. 29 through 32 show that mounting of the wheel guide section 27 on the endless belt 50 is done by engagement. Referring to FIGS. 29 and 30, the side surface 51 of the endless belt 50 in the width direction is formed with an engaging groove 54 which continues in the longitudinal direction, while the end of the sidewall 28 of the wheel guide section 27 is formed with a claw 55 which projects inwards. Thus, the claw 55 engages the engaging groove 54 for integration. FIG. 29 shows an assembling method and FIG. 30 shows a cross-section of the engaging condition.

Figure 31:
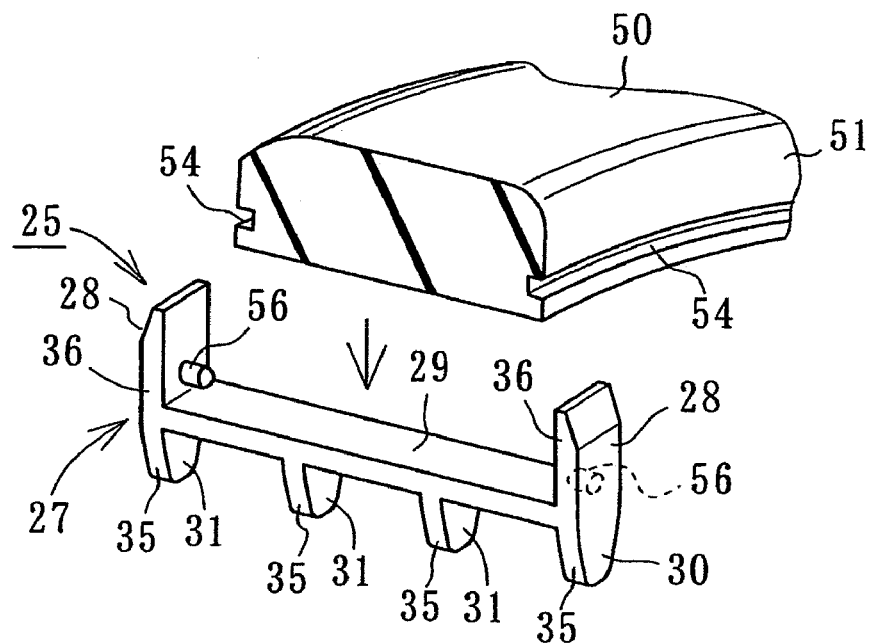
FIG. 31 is a view similar to FIG. 29 showing still further example according to the eighth embodiment.
Figure 32:
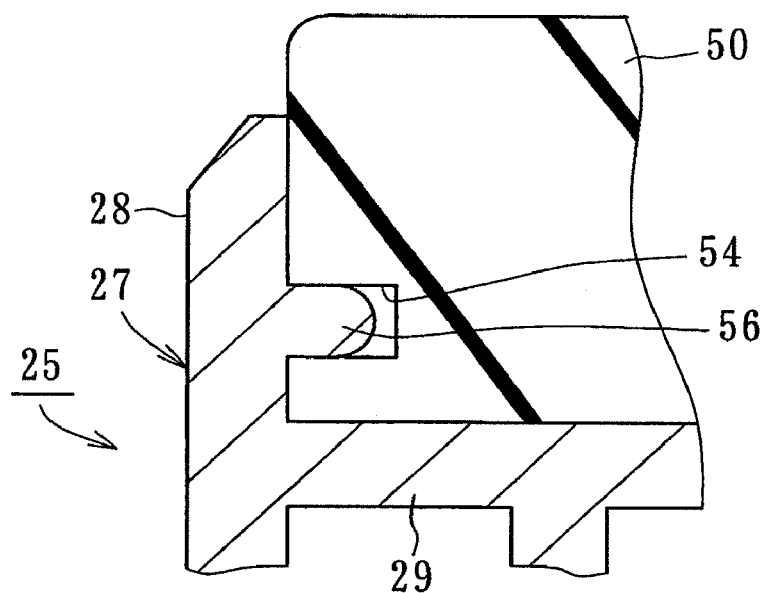
FIG. 32 is a cross-sectional view showing an engaging section of said example of FIG. 31.

FIGS. 31 and 32 show that the inner surface of sidewall 28 of the wheel guide section 27 is formed with an engaging protrusion 56 in place of the claw 55. FIG. 31 is a view corresponding to FIG. 29 and FIG. 32 is a view corresponding to FIG. 30. With this arrangement, it is possible to mount the wheel guide section 27 on the endless belt 50 through a one-touch operation.

In place of the engaging groove 54 which is an object to be engaged by the claw 55 and the engaging protrusion 56, an engaging hole can be provided on the side 51 of the endless belt 50 in the width direction at even intervals in the longitudinal direction. Such an engaging structure can also be applied to assembly of the tire section 26 with the wheel guide section 27 in the case where the piece 25 is independently provided.

Figure 33:
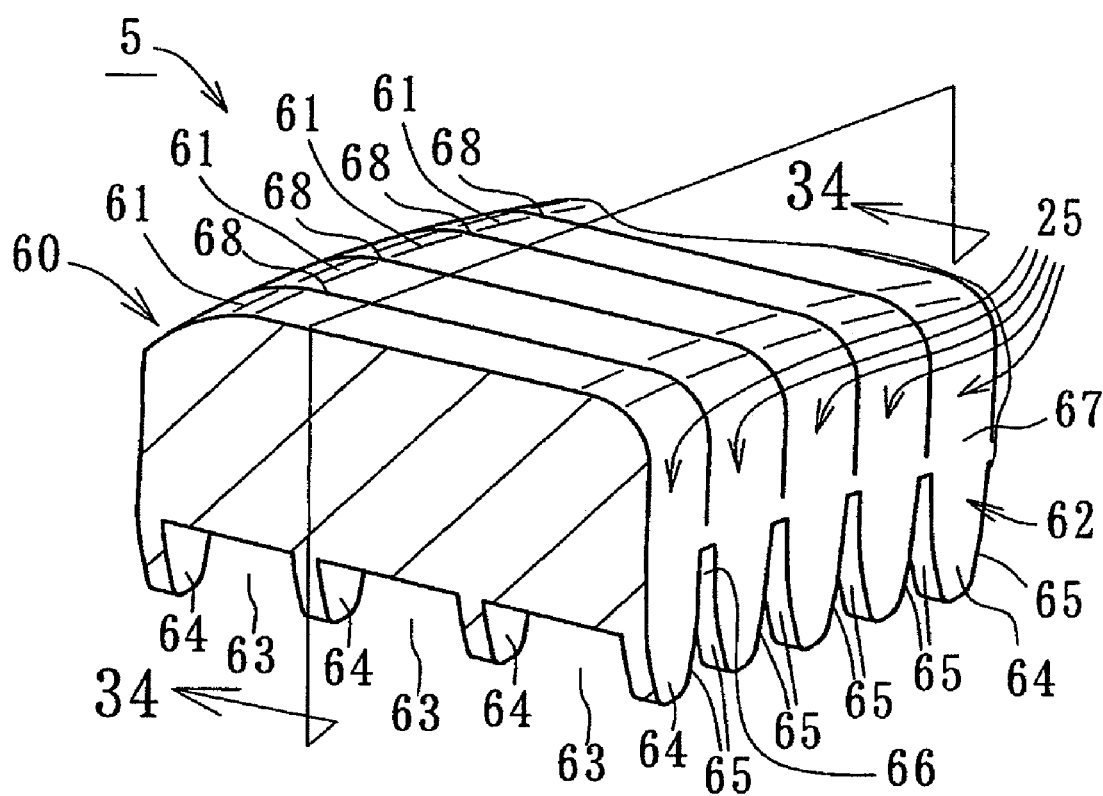
FIG. 33 is a perspective view showing part of a wraparound member according to a ninth embodiment.
Figure 34:
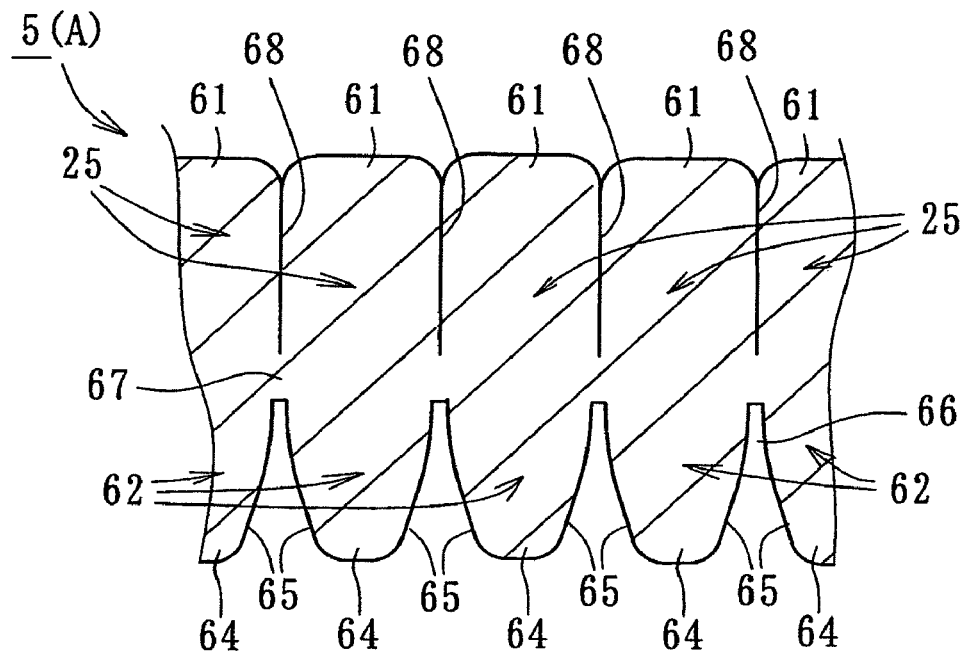
FIG. 34 is a cross-sectional view taken along line 34-34 of FIG. 33.
Figure 35:
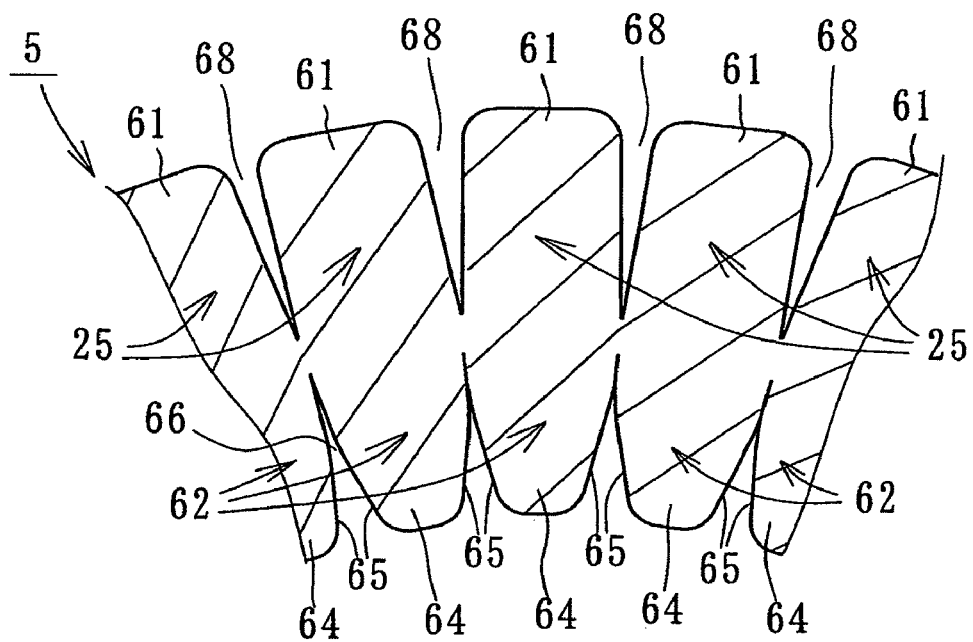
FIG. 35 is a view showing an inward bending condition according to the ninth embodiment.

FIGS. 33 through 35 relate to a ninth embodiment in which a wraparound member 5 is formed of a continuing endless belt 60 in its entirety and each piece 25 is integrally formed in one stretch. In this example, the outer peripheral section of the endless belt 60 serves as a tire section 61 and the inner peripheral section thereof serves as a wheel guide section 62. The wheel guide section 62 having wave-form irregularities in the side view is integrally formed with a guide groove 63 and a guide wall 64 in the width direction. Further, the side surface of the guide wall 64 of the wheel guide section 62 in the front and rear direction is provided with an inclined section 65. A substantially triangular section in the side view is formed between the inclined sections 65 facing side-by-side, wherein each wheel guide section 62 is partitioned by the section 66.

Further, the tire section 61 on the outer peripheral side is provided with a slit 68 in the vertical direction toward a connecting section 67 on the intermediate side. The slit 68 is formed at even intervals in the longitudinal direction of the outer peripheral section of the wrap-around member 5. A section sandwiched by the adjacent slit 68 and section 66 forms one piece 25 and each piece 25 is integrally and continuously formed with the others by the connecting section 67. The width of the slit 68 is small and the sides facing on both ends of the slits 68 of each piece 25 contact the next to exhibit the warp preventing function. In this manner, the outward bending as shown in FIG. 34 is not permitted and the inward bending of the wrap-around member 5 as shown in FIG. 35 is permitted.

In this manner, the wraparound member 5 can be formed in its entirety by a single member having many continuous pieces 25 and the outer peripheral section of the piece 25 is formed between the slits by the slits cut in from the outer peripheral side, and this section can permit the warp prevention and inward bending of the wraparound member 5. Formed between the section 66 wider than the slit 68 on the outer peripheral side is the inner peripheral section of the piece 25 formed on the inner peripheral side which can permit the inward bending of the wraparound member 5. In this manner, it is possible to reduce the number of parts forming the wraparound member 5, provide the simplest structure, and make the production easy.

Figure 36:
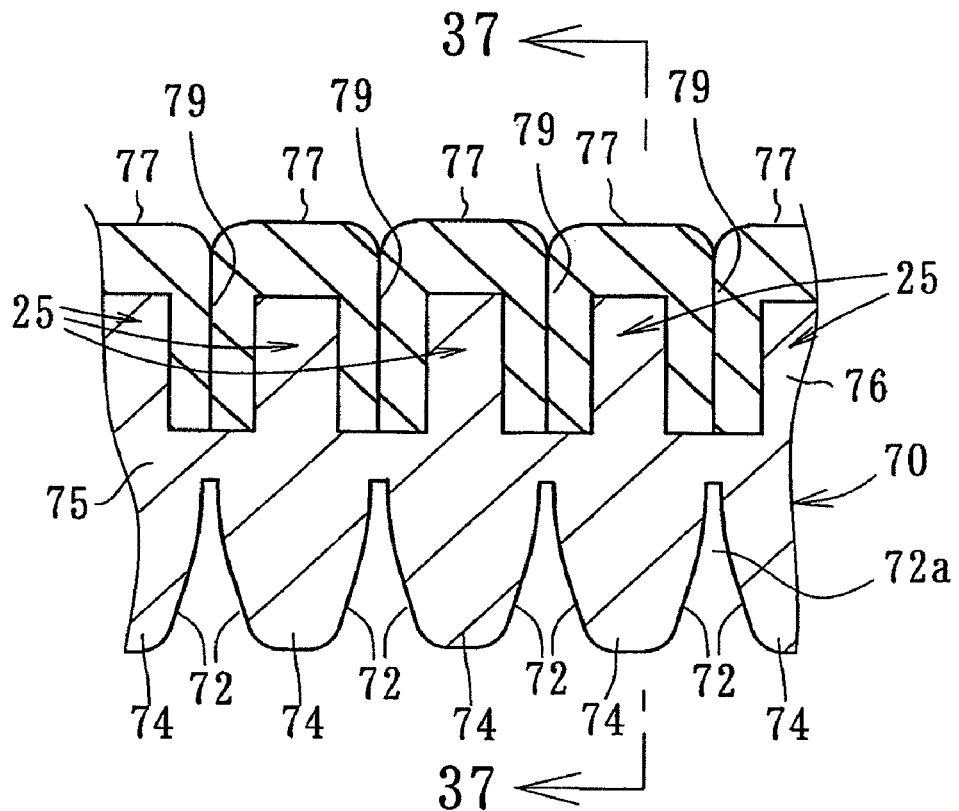
FIG. 36 is a view similar to FIG. 34 according to a tenth embodiment.
Figure 37:
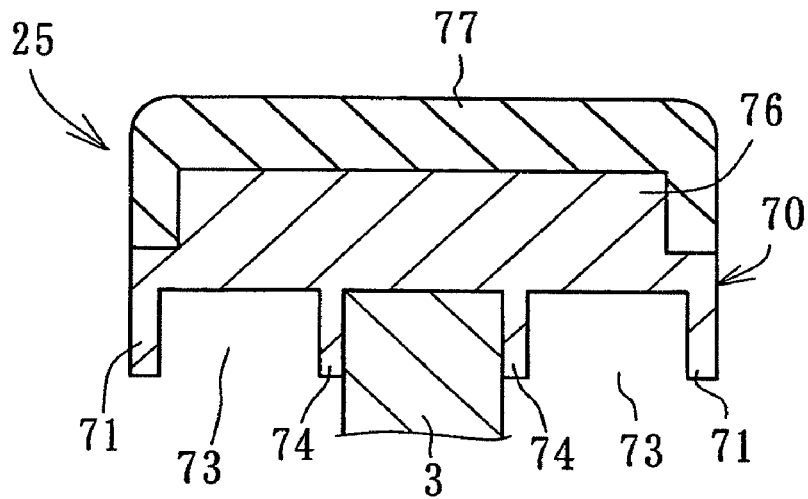
FIG. 37 is a cross-sectional view taken along line 37-37 of FIG. 36.
Figure 38:
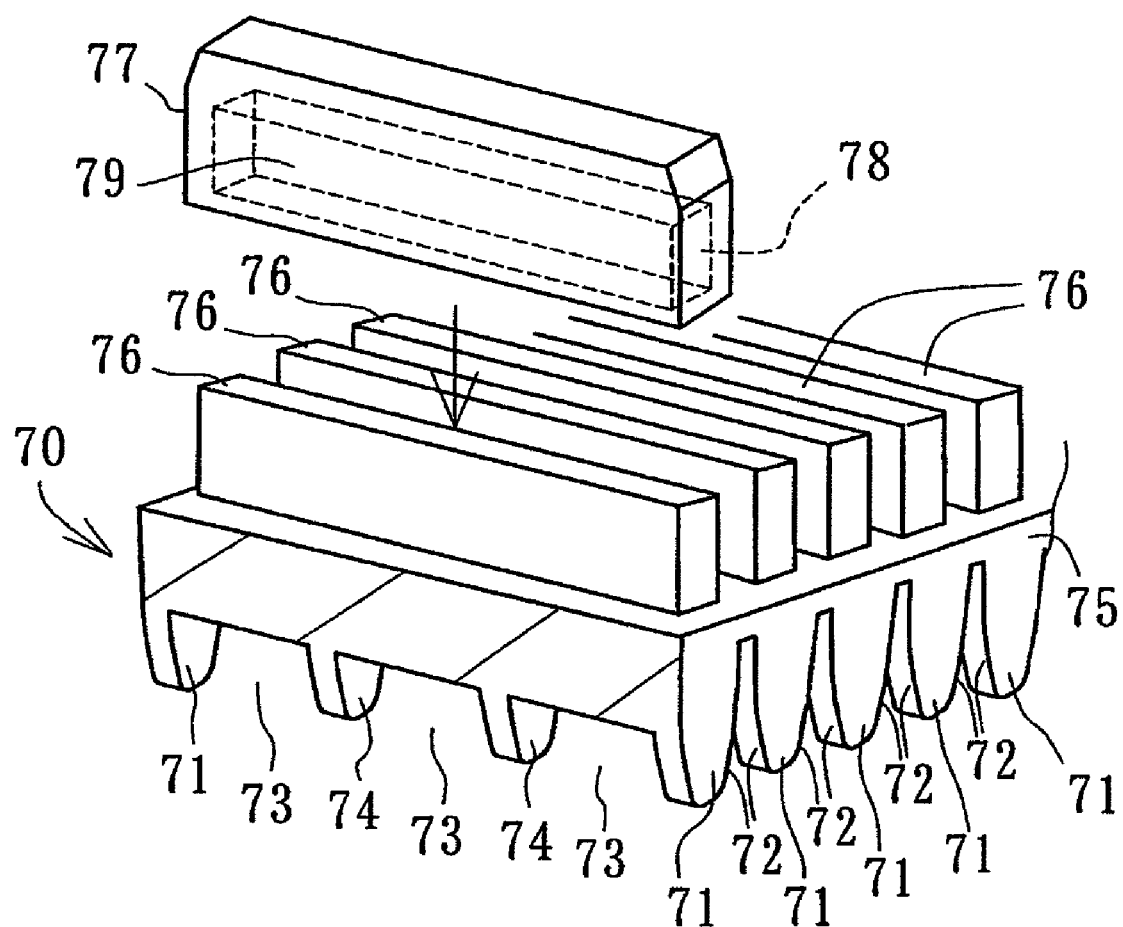
FIG. 38 is a view showing the assembly according to the tenth embodiment.

A tenth embodiment will now be described with reference to FIGS. 36 through 38. In this embodiment, a wheel guide section 70 is formed of a continuous belt and is provided with a guide wall 71 and an inclined section 72 at even intervals in the longitudinal direction. Formed between the inclined sections 72 facing side-by-side is a groove 72a which is substantially triangular in the side view. Each wheel guide section 70 is divided by this groove 72a. A guide groove 73 and a rib 74 are integrally formed between the right and left guide walls 71 of the wheel guide section 70 in the width direction.

An upward projecting mounting block 76 is integrally formed on a connecting section 75 of the wheel guide section 70 at even intervals in the longitudinal direction. A tire block 77 is provided to cover the mounting block 76. The tire block 77 is provided with a downward opening space 78 formed on the thick section. The mounting block 76 is fitted into and integrated with the downward opening space by means of adhesive bonding and the like.

The front and rear sides 79 of each tire block 77 are warp preventing sections which contact each other at the outward inflexible area A. With this arrangement, since the wheel guide section 70 can be formed with an endless belt shape, the wraparound member 5 can be assembled only by mounting each tire block 77 on the common wheel guide section 70. Thus, assembly and production of the wraparound member 5 become simple.

However, by reversing the fitting relationship of the tire block 77 to the wheel guide section 70, a box-shaped structure similar to the securing section 40 shown in FIGS. 12 and 13 can be integrally formed on the side of the wheel guide section 70 and the end of the tire block 77 on the inner peripheral side can be fitted into the box-shaped structure. In this case, the front and rear sides of the box-shaped structure become the contacting sections to exhibit the warp preventing function.

Figure 39:
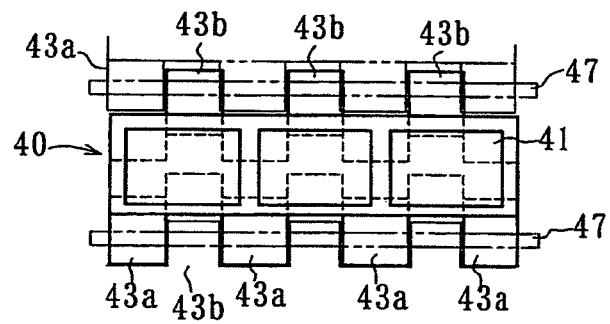
FIG. 39 is a plan view of a fixed section according to an eleventh embodiment.
Figure 40:
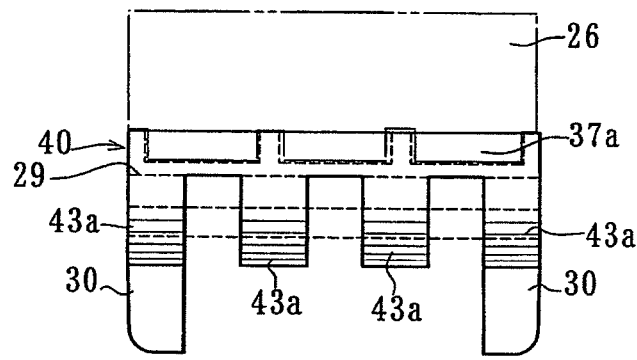
FIG. 40 is a front view of the fixed section according to the eleventh embodiment.
Figure 41:
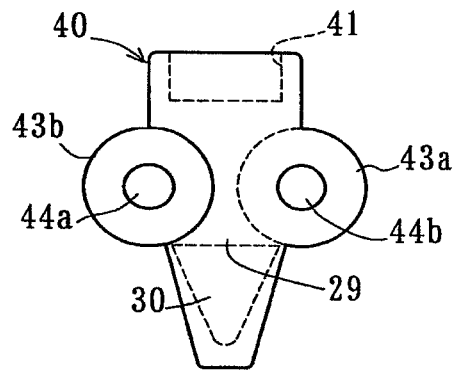
FIG. 41 is a left side view of the fixed section according to the eleventh embodiment.

An eleventh embodiment will be described with reference to FIGS. 39 through 42. This embodiment shows variations of the third embodiment (see FIGS. 12 and 13). FIG. 39 is a plan view of a securing section, FIG. 40 is a front view, FIG. 41 is a left side view, and FIG. 42 is a right side view.

Figure 42:
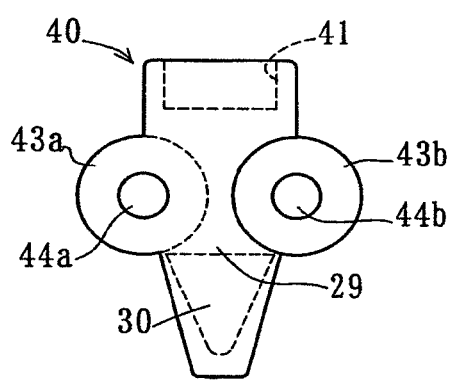
FIG. 42 is a right side view of the fixed section according to the eleventh embodiment.

In these figures, a plurality of first protrusions 43a is provided, each protrusion 43a projecting from one surface of a connecting section 29 at certain intervals and coaxially provided with through-holes 44a (see FIG. 42). Second protrusions 43b integrally projecting from the other surface of the connecting section 29 on the opposite side are fitted between the adjacent first protrusions 43a and coaxially provided with through-holes 44b (see FIG. 41).

In the adjacent pieces 25, if the first protrusions 43a and the second protrusions 43b are alternately fitted between one another and the through-holes 44a and 44b are caused to correspond to be coupled together by connecting shafts 47, the first and second protrusions can be coupled together. Even in this example, only one connecting shaft 47 is necessary for one piece 25. Further, formed on the upper surface of the securing section 40 at certain intervals is a plurality of openings 41 into which a mounting leg 37a for a tire section 26 is fitted.

Figure 43:
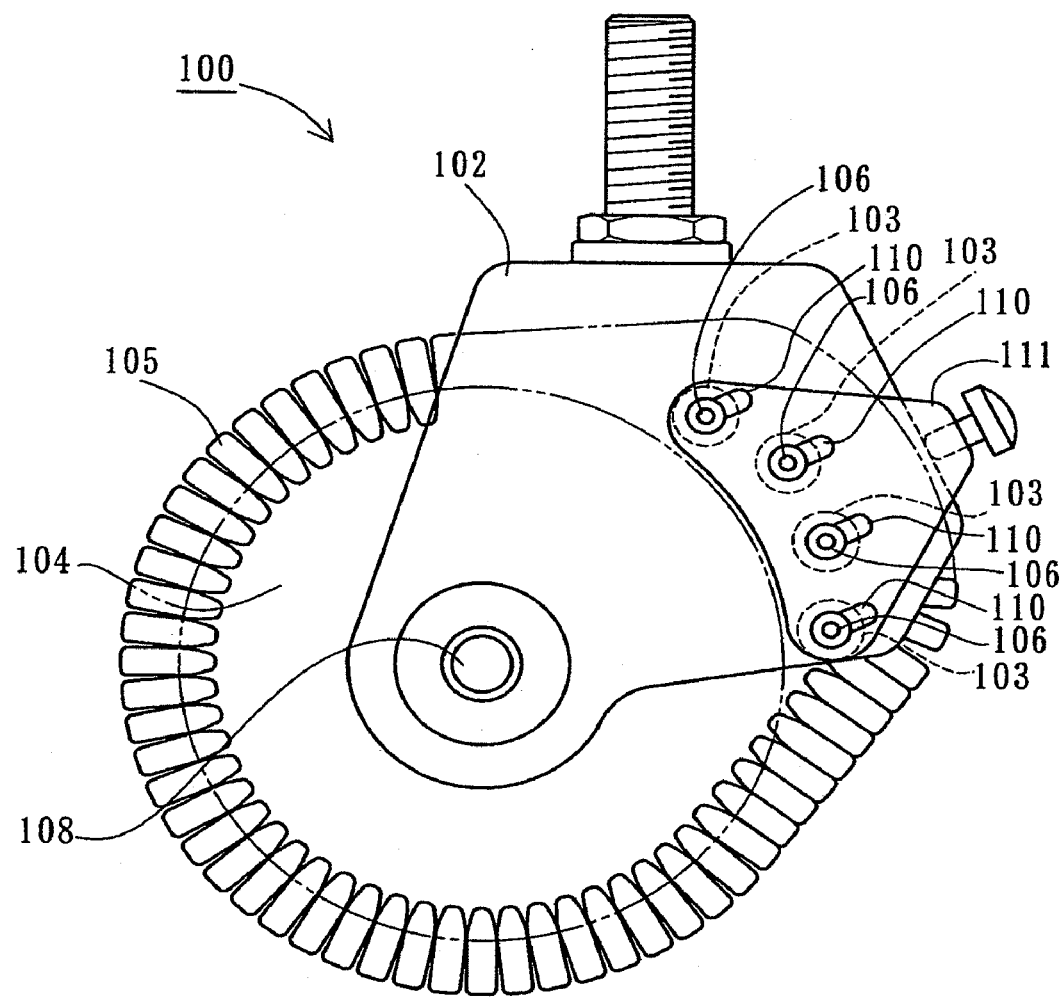
FIG. 43 is a side view of a caster according to a twelfth embodiment.
Figure 44:
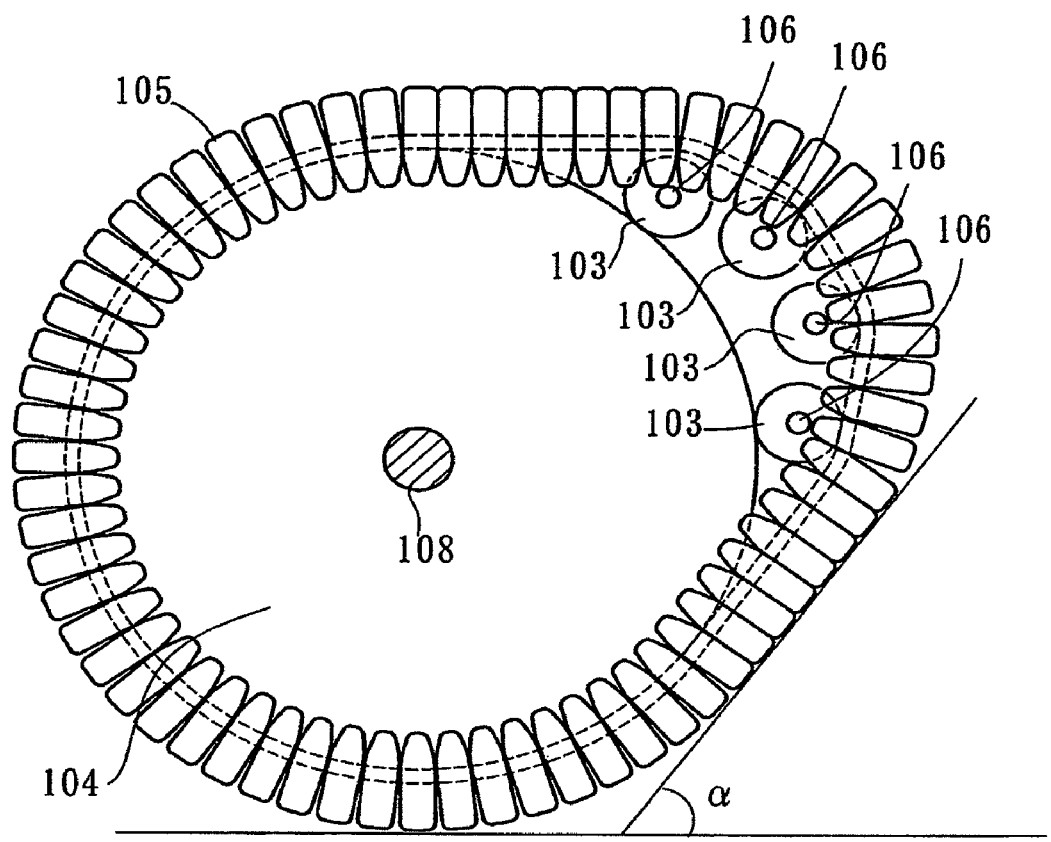
FIG. 44 is a side view showing a substantial part of a driving section according to the twelfth embodiment.
Figure 45:
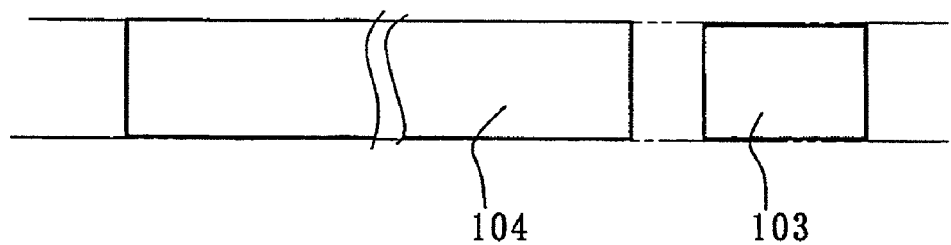
FIG. 45 is a view schematically showing the arrangement of the caster according to the twelfth embodiment.

FIGS. 43 through 45 show a twelfth embodiment. The present and subsequent embodiments are different from a caster of a dual wheel type in which a plurality of first wheels is arranged in the axial direction to sandwich the second wheel therebetween and relate to a caster of a single wheel type in which a single wheel is arranged in the axial direction. Accordingly, description will be made using different reference numerals. In the present embodiment, a caster 100 having the same wraparound member as in the first embodiment is provided, in which a first wheel 103 is reduced in size to make the caster compact in its entirety. FIG. 43 is a general view, FIG. 44 is a view showing only a driving section, and FIG. 45 is a view schematically showing the arrangement of each wheel.

In this example, a plurality of minimized first wheels 103 is arranged in the vicinity of the outer periphery of a second wheel 104 and supported by an axle 106 on a mounting leg 102. Each first wheel 103 is provided to be moveable within a long hole 110 formed on the side of the mounting leg 102 and the position thereof is simultaneously adjustable by a tension control member 111. The first wheel 103 has a diameter of ⅕ or less, preferably of about 1/10 compared to that of the second wheel 104.

As shown in FIG. 45, the width of the first wheel 103 in the thickness direction is almost the same as that of the second wheel 104 and each wheel is collinearly disposed forward and back when viewed from the width direction. The number of the first wheels 103 is arbitrary and set to withstand the load required for the intended use. With this arrangement, it is possible to make the width direction narrower because it is not necessary to provide a plurality of first wheels 103 at certain intervals in the axial direction of the second wheel 104 to sandwich the second wheel 104 therebetween as shown in the example of FIG. 3.

By making the first wheel 103 a minimum size, it is possible to provide the first wheel 103 in the vicinity of the outer periphery of the second wheel 104, thereby reducing the center distance between the first wheel 103 an the second wheel 104. Accordingly, even though the first wheel 103 and the second wheel 104 are collinearly disposed, the caster 1 can be made compact in its entirety.

Further, by making the first wheel 103 a minimum size, it is possible to improve the gap climbing performance because the approach angle alpha can be made larger. It is also possible to make the change of direction easy because a ground contact section is one place as the characteristics of the caster and the ground contact width of the ground contact section can be made narrower because of the above reason.

Reference numeral 108 is an axle for supporting the second wheel 104. A wraparound member 105 is wrapped around the first wheel 103 and the second wheel 104. The wraparound member 105 is almost the same as in the foregoing examples, but the number of wheel guide grooves formed on each piece is limited to one, as described later.

Figure 46:
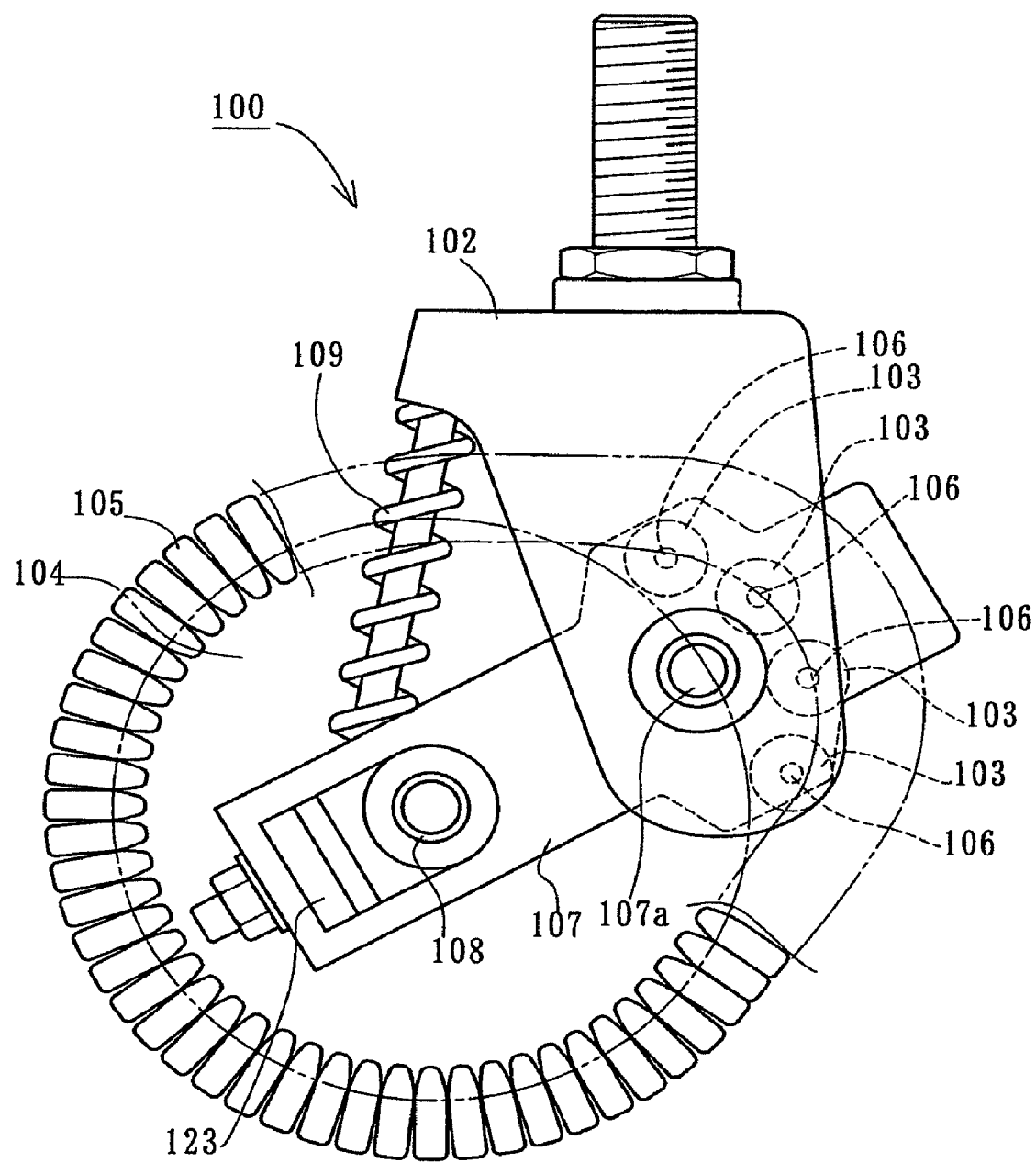
FIG. 46 is a side view of a caster according to a thirteenth embodiment.

FIG. 46 shows a thirteenth embodiment. This embodiment is a variation of the previous embodiment (see FIGS. 43-45) in which a spring suspension structure is adopted. More specifically, one end of a suspension arm 107 is swingably supported by an axle 107a on a mounting arm 102 and the other end thereof is connected to a second wheel 104 by a suspension spring 109.

The position of the axle 108 for supporting the second wheel 104 is adjustable by an adjustment mechanism 123 provided at the end of the suspension arm 107. Tension of a wraparound member 105 can be adjusted by this adjustment mechanism 123. In this manner, impact from the other side can be absorbed by the suspension.

Figure 47:
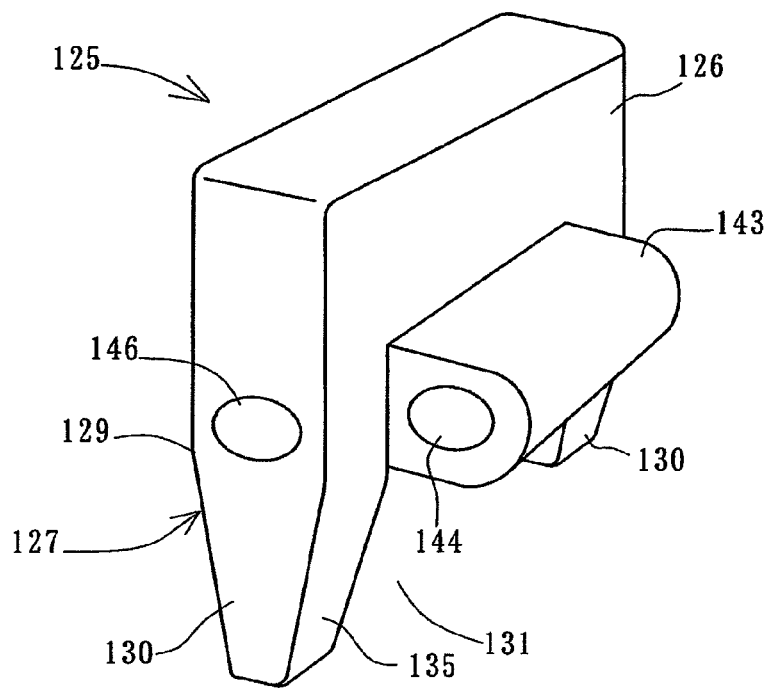
FIG. 47 is a perspective view of a piece according to a fourteenth embodiment.
Figure 48:
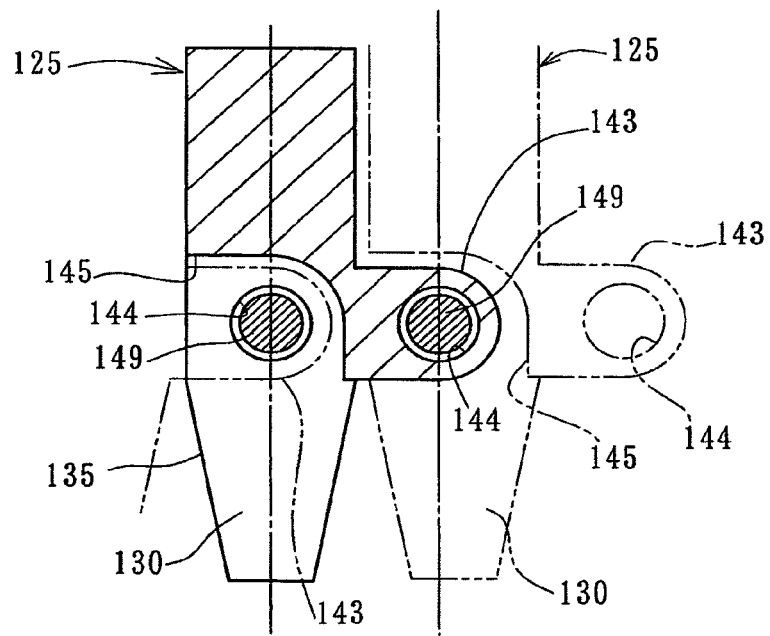
FIG. 48 is a longitudinal sectional view of the piece according to the fourteenth embodiment.

FIGS. 47 and 48 show a fourteenth embodiment. This embodiment is a variation of the sixth embodiment (see FIGS. 19-21). FIG. 47 is a perspective view of a piece 125 and FIG. 48 is a cross-sectional view thereof. In these figures, the piece 125 is provided in such a manner that a tire section 126 and a wheel guide section 127 are disposed above and below a connecting section 129 in the same manner as above.

Guide walls 130 of the wheel guide section 127 are made symmetric in the front and rear direction (i.e., the right and left of the figure) and the intermediate section of the wheel guide section 127 in the width direction is a single wheel guide groove 131 formed of a cut out depression sandwiched between the right and left guide walls 130. This wheel guide groove 131 is provided for the piece 125 used in the examples shown in FIGS. 47 and 48, wherein only one guide groove 131 is formed because only one first wheel 103 is used in the width direction (i.e., the direction of the axis of rotation). This applies to each of the following examples.

A protrusion 143 projecting from one side of the connecting section 129 is formed to have the same width as the wheel guide groove 131 and adapted to fit between the guide walls 130 of the adjacent piece 125. The protrusion 143 is formed with a protrusion through-hole 144. The wheel guide section 127 is provided with a depression 145 for receiving a protrusion 143 of the adjacent piece 125 which enters from the opposite side of the protrusion 143 of the connecting section 129. The depression 145 opens toward the wheel guide groove 131. The intermediate section of the connecting section 129 in the front and rear direction is also formed with a piece through-hole 146 passing through the depression 145 in the width direction.

The protrusion 143 of one piece 125 is fitted into the wheel guide groove 131 of the adjacent piece 125 and then inserted within the depression 145. Since the protrusion through-hole 144 corresponds to the piece through-hole 146 of the adjacent piece 125, a connecting shaft 149 is inserted there for coupling. In this manner, the piece 125 can be connected with a single connecting shaft 149. Further, a guide inclined surface 135 of the guide wall 130 can be symmetrically provided back and forth (i.e., the rotational direction of the wrap-around member is referred to as "front").

Figure 49:
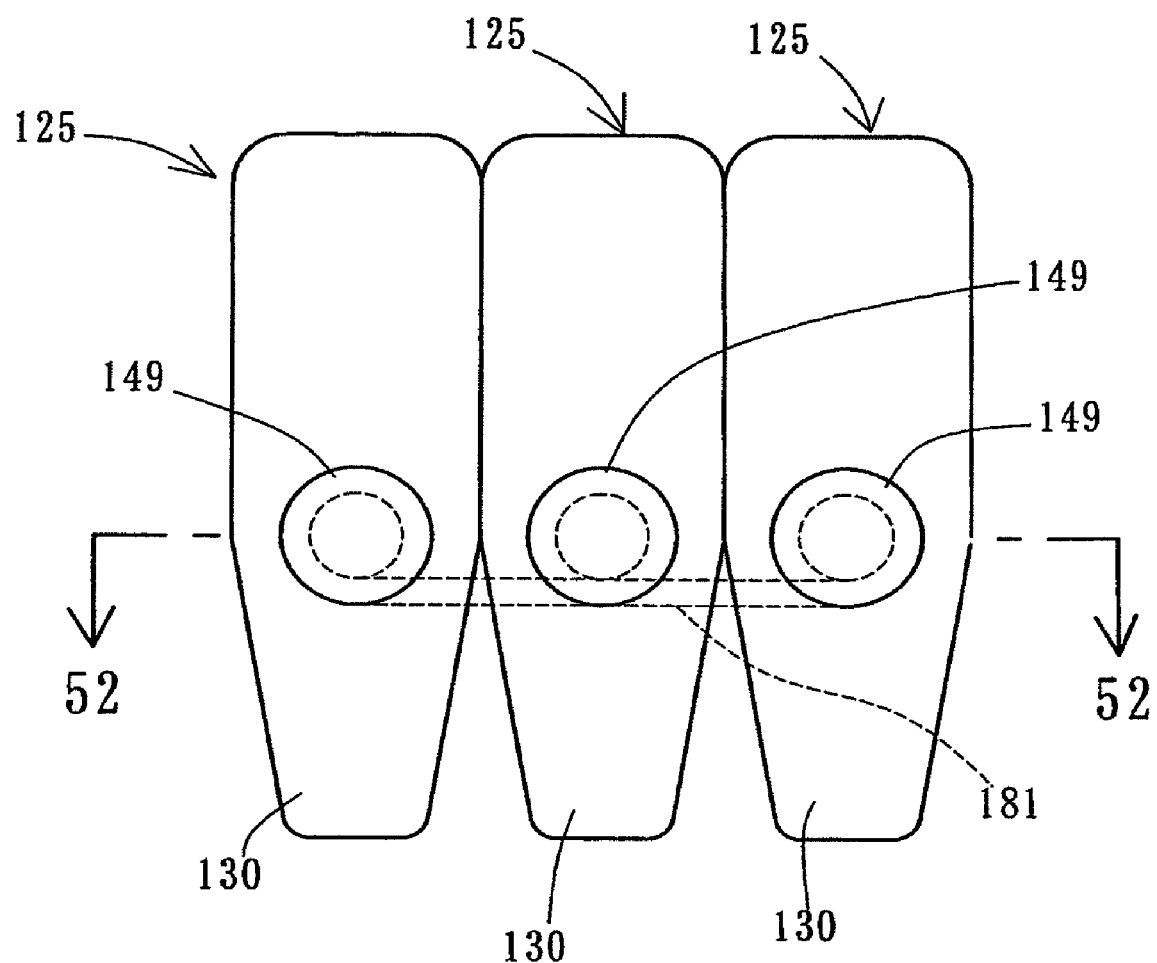
FIG. 49 is a view showing the connecting condition of pieces according to a fifteenth embodiment.
Figure 50:
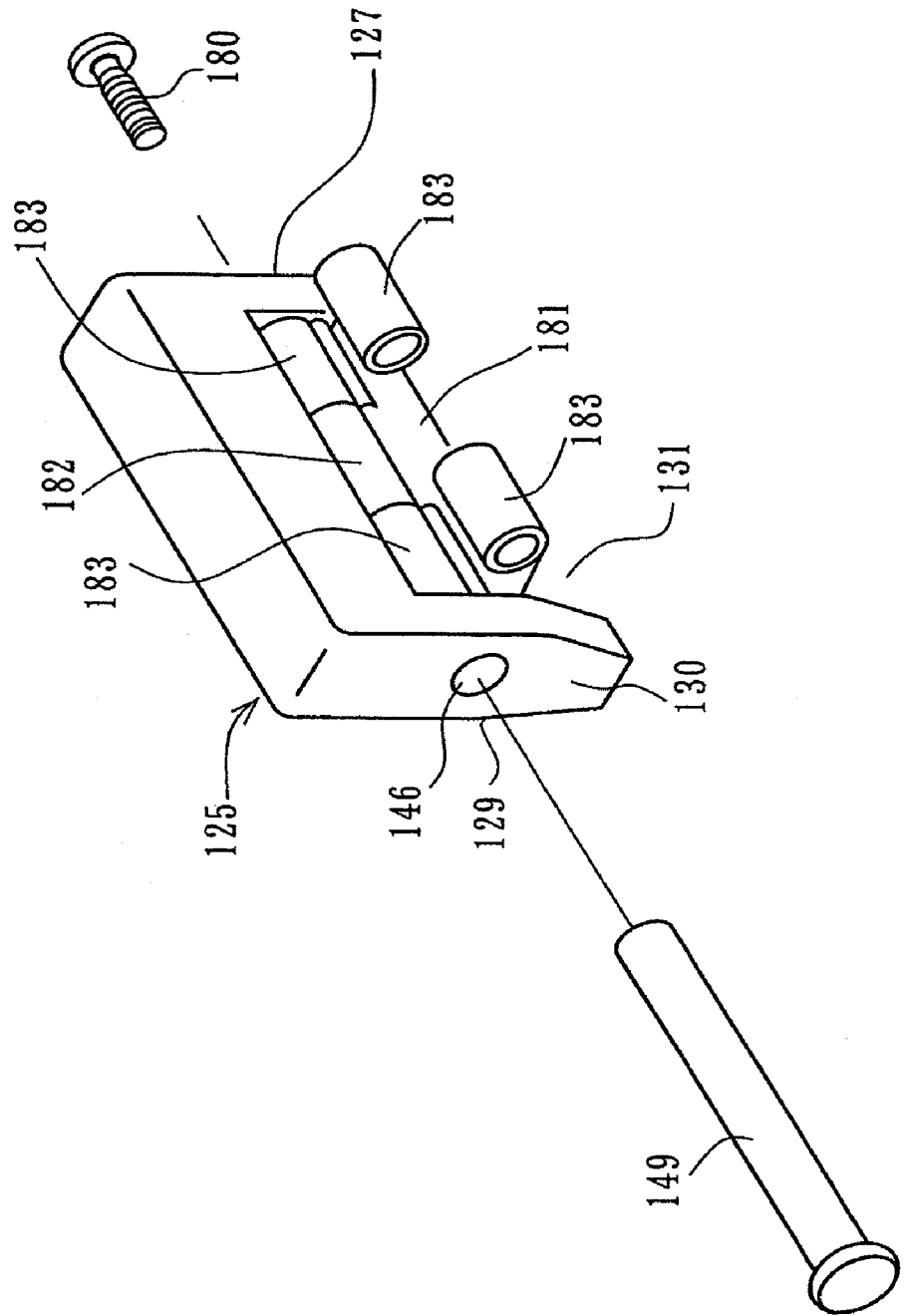
FIG. 50 is a view showing the assembly of the piece according to the fifteenth embodiment.
Figure 51:
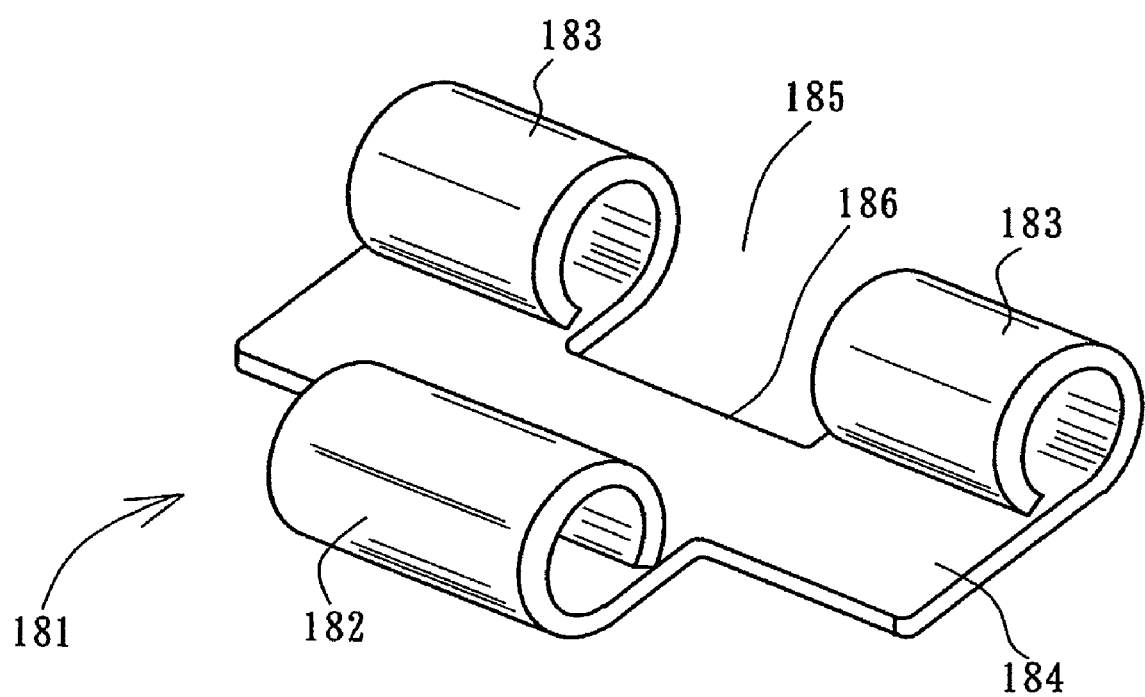
FIG. 51 is a perspective view of a joint piece according to the fifteenth embodiment.
Figure 52:
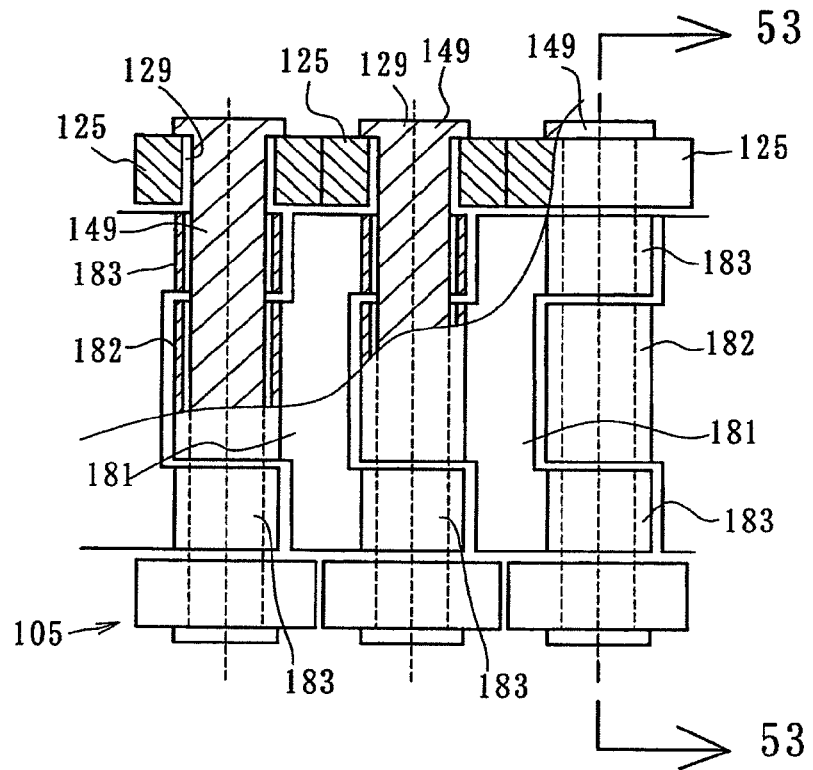
FIG. 52 is a cross-sectional view taken along line 52-52 of FIG. 49.
Figure 53:
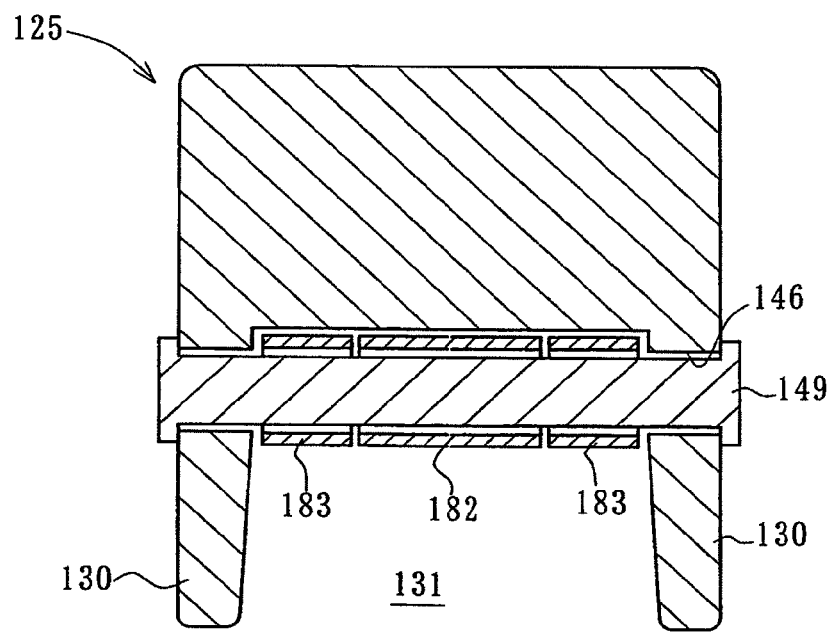
FIG. 53 is a cross-sectional view taken along line 53-53 of FIG. 52.

A fifteenth embodiment is shown in FIGS. 49 through 53. In this embodiment, the adjacent pieces 125 are connected using a joint piece 181 which is a separate body from the piece 125. FIG. 49 is a view showing the connecting condition of the piece 125, FIG. 50 is a perspective view showing a connecting method, and FIG. 51 is a perspective view of the joint piece 181. FIG. 52 is a cross-sectional view taken along line 52-52 of FIG. 49 and FIG. 53 is a cross-sectional view taken along line 53-53 of FIG. 52.

In these figures, the wheel guide section 127 of the piece 125 is formed of a substantially double housing provided with a wheel guide groove 131 of a cut out depression formed between a pair of guide walls 130. The joint piece 181 is fitted within the wheel guide groove 131 and a first pipe section 182 of the joint piece 181 is fitted into a second pipe section 183 of the adjacent joint piece 181, wherein the piece 125, and the adjacent joint pieces 181 and 181 are coupled together by means of a connecting shaft 149 inserted from the piece through-hole 146 formed on the cross section 129. The end of the connecting shaft 149 is secured by a suitable means such as a screw 180. Caulking, circlip or the like are also available as a simple securing method.

The joint piece 181 can be easily formed from a metal plate by press molding as shown in FIG. 51. The central section of one end of a plate section 184 is rolled in a pipe shape to form a first pipe section 182, while on the other side, a pair of second pipe sections 183 is formed at a certain gap 185 on each end of the plate section 184 in the width direction to sandwich the first pipe section 182 therebetween. Formed between the pair of second pipe sections 183 of the plate section 184 is a notch 186 for communicating with the gap 185 which rotatably support the first pipe section 182 of the other joint piece 181 fitted.

Figure 54:
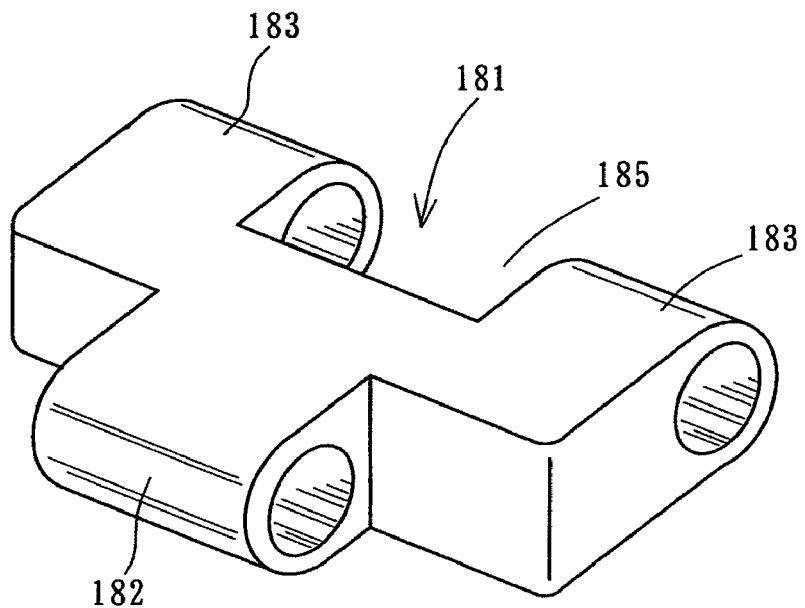
FIG. 54 is a perspective view showing a variation of the joint piece.

FIG. 54 shows a variation of the joint piece 181 in which the first pipe section 182 and the second pipe section 183 are integrally formed from metal or resin material. With this formation, the joint piece can be made simpler.

Figure 55:
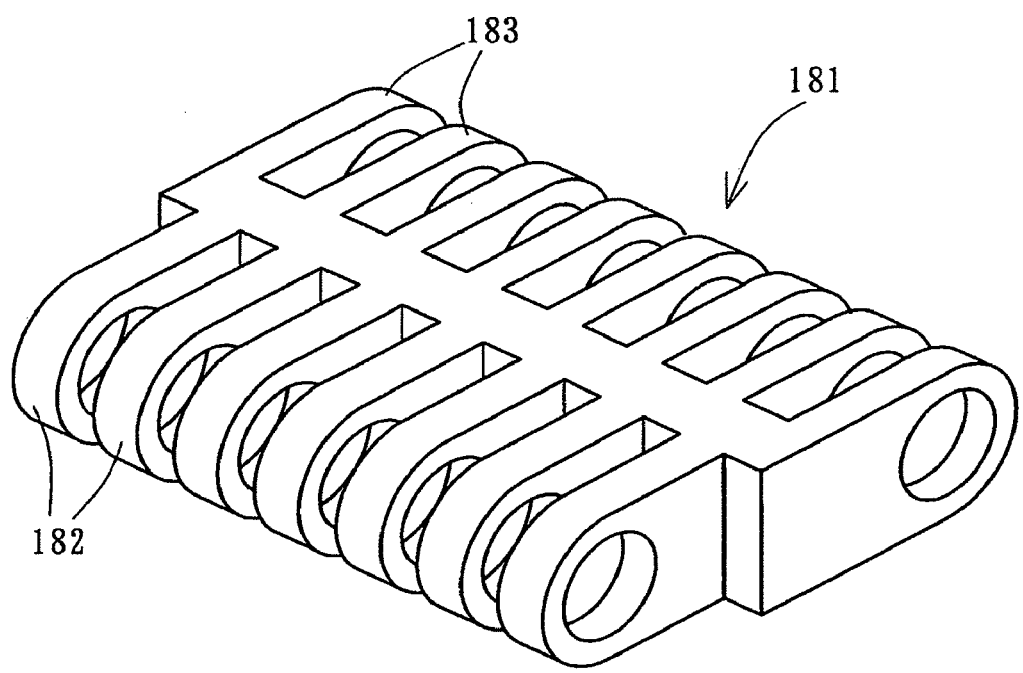
FIG. 55 is a perspective view showing another variation of the joint piece.
Figure 5:
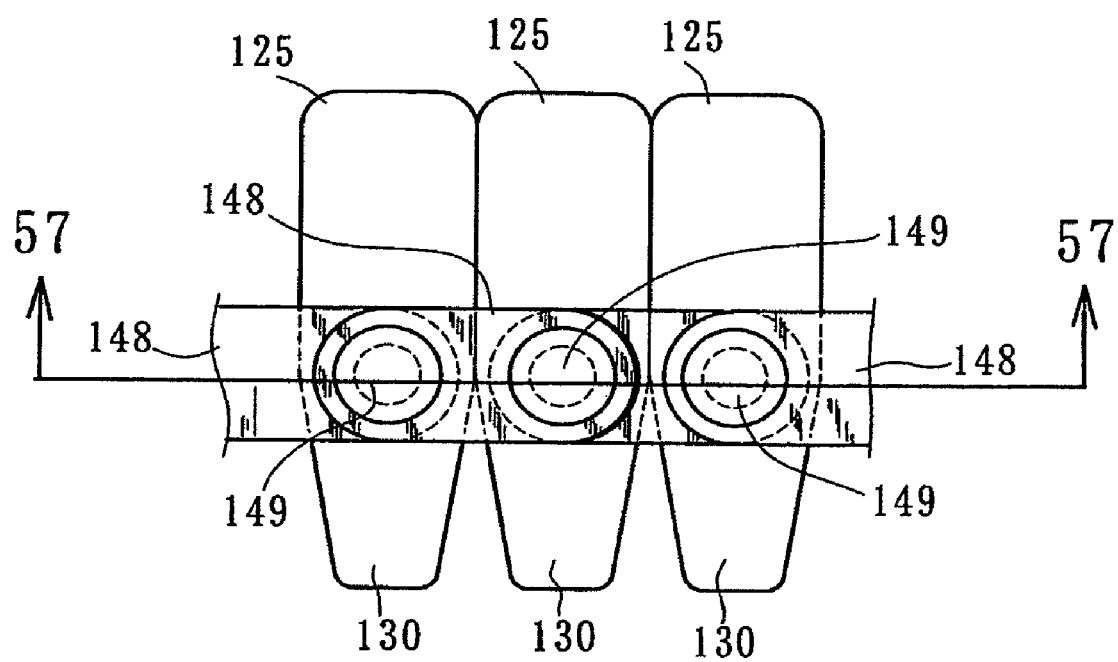

FIG. 55 shows another variation of the joint piece 181 in which many first and second pipe sections 182 and 183 are formed and first comb-shaped and then formed from resin or metal. In this manner, since the fitting sections are increased, stable coupling can be maintained even for a large load.

Figure 57:
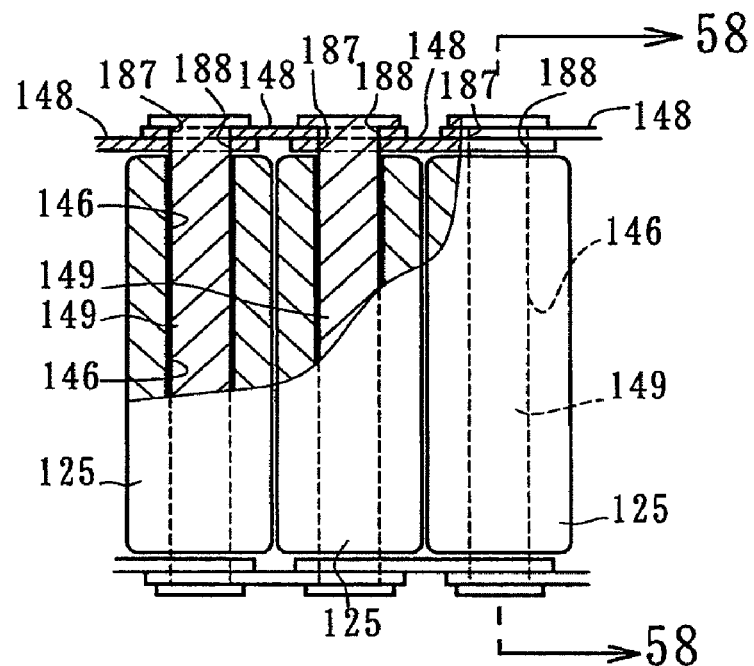
FIG. 57 is a cross-sectional view taken along line 57-57 of FIG. 56.
Figure 58:
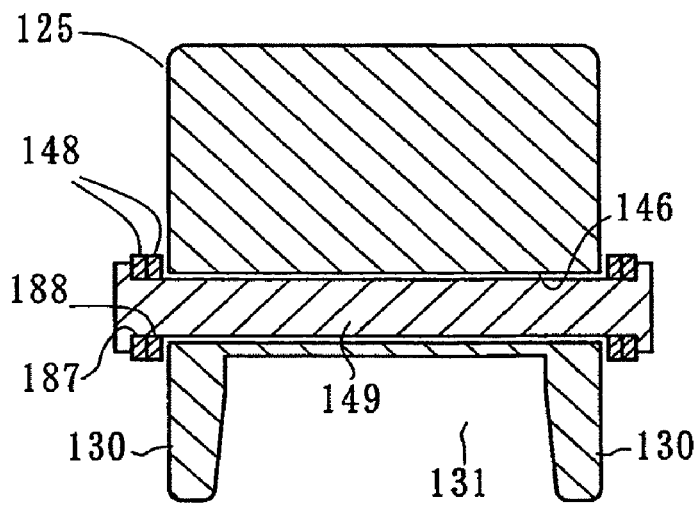
FIG. 58 is a cross-sectional view taken along line 58-58 of FIG. 57.

A sixteenth embodiment is shown in FIGS. 56 through 58. This is a variation of the seventh embodiment (see FIGS. 22 and 23). FIG. 56 is a view showing the coupling condition and FIG. 57 is a cross-sectional view taken along line 57-57 of FIG. 56. FIG. 58 is a cross-sectional view taken along line 58-58 of FIG. 57.

In this example, connecting the piece 125 using a connecting plate 148 is the same as above. However, a connecting hole 187 of one connecting plate 148 and a connecting hole 188 of the other connecting plate 148, of the adjacent connecting plates 148 in the front and rear direction, of a pair of connecting holes 187 and 188 formed on the connecting plate 148, are superposed, then superposed on a single through-hole 146 formed on the center of the piece 125 in the front and rear direction, wherein the pair of adjacent connecting plates 148 and 148 in the front and rear direction and the piece 125 are connected by a single connecting shaft 149. In this manner, one each of through-hole 146 and connecting shaft 149 need only to be provided for one piece 125.

It will be understood that the present invention is not limited to the embodiments described above, but may be varied in many ways. For example, if the contacting section 36 in FIG. 8 etc. is provided not only to make the front and rear side thereof parallel, but also make it slightly open to the outer circumferential direction, it is possible to control warping from the obtuse condition slightly before straightening. On the contrary, if the contacting section 36 is made to slightly taper, it is possible to prevent further warping in the slightly warped condition. In other words, the warp prevention in the present invention does not always mean making part of the wraparound member 5 a straight condition parallel to the common tangent C2, but it is possible to freely adjust the extent of warping to be controlled within some permissible range.

It is desirable that such a permissible range of warping be less than 5 percent of the length of the outward inflexible area A in which the amount of depression of the wrap-around member 5 can be regarded as the length of the common tangent section C2. This is a range of permissible bending of the wrap-around member 5 during climbing the gap. If such a range is set, it is possible to scarcely produce an effect of depression in gap climbing. If the range is larger than 5 percent, the climbing performance drastically deteriorates. The preferred permissible range is less than 3 percent and if such a range is set, it is possible to maintain part of the wrap-around member 5 contacting the gap in a substantially straight condition including the tolerance.

Further, the length of the outward inflexible area A varies with the center distance between the two axles 6 and 8, but if the center distance is set slightly larger than the radius of the second wheel 4 adding the radius of the axle 6, the axle 6 is assumed to be in non-contact with the second wheel 4 and to approach the axle 8 wherever possible. In this manner, since the length of the outward inflexible area A becomes shortest, it is possible to reduce a change of diameter due to bending of the imaginary wheel W to as small as possible.

The present invention can also be applied for various purposes. It can be used for almost all casters known in the market, for example, the front wheels of a wheelchair, furniture such as a table, a wheeled stretcher, a shopping cart, and wheels such as a light car including a handcart. Further, as shown by an imaginary (virtual) line in FIG. 1, if a motor M is provided within the side surface of the second wheel, it is also possible to provide a self-propelled device of a wheel motor type.

What is claimed is:

1. A caster comprising:
first and second wheels disposed forward and back and an endless wrap-around member wrapped around the first and second wheels,
wherein the wrap-around member includes:
a plurality of pieces continuous in a circumferential direction, each piece being provided with an outer peripheral section and an inner peripheral section which are moveable independent of the adjacent pieces and permit the wrap-around member to bend along the first and second wheels, and the outer peripheral section is adapted to contact the outer peripheral sections of the adjacent pieces when the wrap-around member pushed inside the surface of rotation by an external force, thereby preventing the wrap-around member from being depressed inside the surface of rotation in excess of a predetermined amount,
wherein each of the pieces is formed with a depression serving as a wheel guide groove,
and further comprising:
a plurality of joint pieces equaling in number to the plurality of pieces, and
a plurality of connecting shafts equaling in number to the plurality of pieces,
wherein each of the joint pieces is provided with a front pipe section on a front side thereof, and a rear pipe section on a rear side thereof, and the front pipe section is offset in an axial direction of the wheels relative to the rear pipe section, so that the front pipe section of one joint piece and the rear pipe section of the adjacent joint piece are fitted into the wheel guide groove of each of the pieces, and
wherein the pieces of the wrap-around member are connected together by having only a single one of the connecting shafts penetrating though each of the pieces and through the front pipe section of the one joint piece and the rear pipe section of the adjacent joint piece which are fitted into the wheel guide groove thereof.

2. The caster according to claim 1, wherein the outer peripheral section is provided in such a manner that the outer peripheral sections of the adjacent pieces contact each other, when they are close on a common tangent of the first and second wheels.

3. The caster according to claim 1, wherein each piece is independently formed.

4. The caster according to claim 1, wherein the piece is provided with a tire section on the outer peripheral side and a wheel guide section into which the outer peripheral sections of the first and second wheels are fitted.

5. The caster according to claim 4, wherein the tire section and the wheel guide section are respectively formed as separate bodies.

6. The caster according to claim 1, wherein the first and second wheels overlap each other when viewed from the direction perpendicular to the surface of rotation.

7. The caster according to claim 1, wherein the first wheel (103) is provided in such a manner that the diameter is $\frac{1}{5}$ or less of that of the second wheel (104) and its thickness is substantially the same as that of the second wheel (104), wherein the first wheel (103) is disposed close to the outer periphery of the second wheel (104) so that the first and second wheels are disposed on the same straight line when viewed from the direction of each thickness.

\* \* \* \* \*